(12) United States Patent
Yoon et al.

(10) Patent No.: US 11,507,452 B1
(45) Date of Patent: Nov. 22, 2022

(54) ERROR CHECKING FOR SYSTOLIC ARRAY COMPUTATION

(71) Applicant: Google LLC, Mountain View, CA (US)

(72) Inventors: Doe Hyun Yoon, Foster City, CA (US); Norman Paul Jouppi, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/410,558

(22) Filed: Aug. 24, 2021

Related U.S. Application Data

(60) Provisional application No. 63/222,549, filed on Jul. 16, 2021.

(51) Int. Cl.
*G06F 11/00* (2006.01)
*G06F 11/10* (2006.01)
*G06F 15/80* (2006.01)

(52) U.S. Cl.
CPC ...... *G06F 11/1004* (2013.01); *G06F 15/8046* (2013.01)

(58) Field of Classification Search
None
See application file for complete search history.

(56) References Cited

U.S. PATENT DOCUMENTS

| | | | | |
|---|---|---|---|---|
| 5,323,335 A * | 6/1994 | Mitchell | ............ | H03H 17/0257 708/320 |
| 8,406,334 B1 * | 3/2013 | Rao | ...................... | H04B 7/0854 375/267 |
| 11,232,062 B1 * | 1/2022 | Volpe | ..................... | G06F 7/5443 |
| 11,308,026 B1 * | 4/2022 | Volpe | ..................... | G06F 7/5443 |
| 11,308,027 B1 * | 4/2022 | Volpe | ................. | G06F 15/8046 |
| 2003/0018675 A1 * | 1/2003 | Asai | ..................... | G06F 15/8046 708/322 |
| 2015/0188572 A1 * | 7/2015 | Silberman | ......... | H03M 13/1545 714/781 |
| 2019/0236049 A1 * | 8/2019 | Vantrease | ............. | G06N 3/063 |

(Continued)

OTHER PUBLICATIONS

J. -. Han and D. C. Krishnan, "Linear arithmetic code and its application in fault-tolerant systolic array," Proceedings. IEEE Energy and Information Technologies in the Southeast, 1989, pp. 1015-1020 vol. 3, doi: 10.1109/SECON.1989.132562. (Year: 1989).*

(Continued)

*Primary Examiner* — Daniel F. McMahon
(74) *Attorney, Agent, or Firm* — Lerner, David, Littenberg, Krumholz & Mentlik, LLP

(57) ABSTRACT

Aspects of the disclosure are directed to a computation unit implementing a systolic array and configured for detecting errors while processing data on the systolic array. Checksum circuit in communication with a systolic array is configured to compute checksums and perform error detection while the systolic array processes input data. Instead of pre-generating checksums in input matrices, input matrices can be directly fed into the systolic array through the checksum circuit. On the output side, the checksum circuit can generate and compare checksums with checksums in an output matrix generated by the systolic array. Error checking the operations to generate the output matrix can be performed without delaying the operations of the systolic array, and without preprocessing the input matrices.

20 Claims, 14 Drawing Sheets

(56) References Cited

U.S. PATENT DOCUMENTS

2021/0157548 A1* 5/2021 Elmer ................. G06F 9/30076

OTHER PUBLICATIONS

Safarpour and Silvén. Algorithm Level Error Detection in Low Voltage Systolic Array. Jun. 2021. IEEE Transactions on Circuits and Systems-II. pp. 1-5. Retrieved from the Internet: <https://www.techrxiv.org/articles/preprint/Algorithm_Level_Error_Detection_in_Low_Voltage_Systolic_Array/14915100>.

Wu et al. Fault Tolerant Matrix-Matrix Multiplication: Correcting Soft Errors On-Line. Nov. 13, 2011. Colorado School of Mines. 18 pages. Retrieved from the Internet: <https://www.csm.ornl.gov/srt/conferences/Scala/2011/wu.pdf>.

Paul et al. Voltage Scaling for Partitioned Systolic Array in a Reconfigurable Platform. Feb. 13, 2021. 6 pages. Retrieved from the Internet: <https://arxiv.org/pdf/2102.06888.pdf>.

Zhang et al. Analyzing and Mitigating the Impact of Permanent Faults on a Systolic Array Based Neural Network Accelerator Feb. 17, 2018. 6 pages. Retrieved from the Internet: <https://arxiv.org/pdf/1802.04657.pdf>.

Kung and Lam. Fault-Tolerant VLSI Systolic Arrays and Two-Level Pipelining. Nov. 28, 1983. Proceedings of SPIE 0431, Real-Time Signal Processing VI. 17 pages. Retrieved from the Internet: <https://www.spiedigitallibrary.org/conference-proceedings-of-spie/0431/0000/Fault-Tolerant-VLSI-Systolic-Arrays-and-Two-Level-Pipelining/10.1117/12.936453.full?SSO=1>.

Wang and Jen. Redundancy design for a fault tolerant systolic array. May 1990. IEE Proceedings, vol. 137, Pt. E, No. 3. pp. 218-226. Retrieved from the Internet: <https://ir.nctu.edu.tw/bitstream/11536/4117/1/A1990DC36000007.pdf>.

Gundi et al. EFFORT: Enhancing Energy Efficiency and Error Resilience of a Near-Threshold Tensor Processing Unit. 2020 25th Asia and South Pacific Design Automation Conference (ASP-DAC), pp. 241-246.

Pandey et al. GreenTPU: Improving Timing Error Resilience of a Near-Threshold Tensor Processing Unit. Jun. 2019. DAC '19: Proceedings of the 56th Annual Design Automation Conference 2019. Article No. 173. 6 pages. Retrieved from the Internet: <https://dl.acm.org/doi/pdf/10.1145/3316781.3317835>.

Huang and Abraham. Algorithm-Based Fault Tolerance for Matrix Operations. Jun. 1984. IEEE Transactions on Computers, vol. C-33, No. 6, pp. 518-528. Retrieved from the Internet: <https://graal.ens-lyon.fr/~abenoit/CR02/papers/abft2.pdf>.

Ernst et al. Razor: A Low-Power Pipeline Based on Circuit-Level Timing Speculation. Dec. 2003. 36th Annual International Symposium on Microarchitecture (MICRO-36), 12 pages. Retrieved from the Internet: <https://web.eecs.umich.edu~taustin/papers/MICRO36-Razor.pdf>.

Zhang et al. ThUnderVolt: Enabling Aggressive Voltage Underscaling and Timing Error Resilience for Energy Efficient Deep Learning Accelerators. Mar. 13, 2018. 7 pages. Retrieved from the Internet: <https://arxiv.org/pdf/1802.03806.pdf>.

Li et al. Efficient Soft-Error Detection for Low-precision Deep Learning Recommendation Models. Feb. 27, 2021. 8 pages. Retrieved from the Internet: <https://arxiv.org/pdf/2103.00130.pdf>.

Hari et al. Making Convolutions Resilient via Algorithm-Based Error Detection Techniques. Jun. 8, 2020. 12 pages. Retrieved from the Internet: <https://arxiv.org/pdf/2006.04984.pdf>.

Zhao et al. FT-CNN: Algorithm-Based Fault Tolerance for Convolutional Neural Networks. Sep. 7, 2020. 13 pages. Retrieved from the Internet: <https://arxiv.org/pdf/2003.12203.pdf>.

Nair and Abraham. Real-Number Codes for Fault-Tolerant Matrix Operations on Processor Arrays. Apr. 1990. IEEE Transactions on Computers, vol. 39, No. 4, pp. 426-435. Retrieved from the Internet: <http://pduwork.pbworks.com/f/Real-number+codes+for+fault-tolerant+matrix+operations+on+processor+arrays.pdf>.

* cited by examiner

ERROR CHECKING FOR SYSTOLIC ARRAY COMPUTATION

CROSS REFERENCE TO RELATED APPLICATIONS

The present application claims the benefit of the filing date of U.S. Provisional Patent Application No. 63/222,549 filed Jul. 16, 2021, the disclosure of which is hereby incorporated herein by reference.

BACKGROUND

Systolic arrays are arrays of processing elements, such as processors, microprocessors, or specialized circuitry configured to process some data. Adjacent processing elements of a systolic array can be connected through one or more interconnects, e.g., wires or other physical connections, for example on a printed circuit board.

Algorithm-based fault tolerance (ABFT) refers to schemes or techniques for detecting and correcting errors during the execution of different types of arithmetic or logic algorithms, such as matrix multiplication, Fourier transforms, etc. In the case of matrix multiplication, e.g., A×B=C for input matrices A, B, and output matrix C, ABFT for matrix multiplication includes generating a checksum row for A, and a checksum column for matrix B. Each element in a checksum row for A is a result of a linear operation performed on elements in a respective column of matrix A, e.g., adding each element in a column of matrix A to generate a checksum value in the checksum row of matrix A. Similarly, each checksum value in column B is the result of a linear operation performed on elements in a respective row of matrix B.

After matrices A and B (with their corresponding checksum row/column) are multiplied, the output matrix includes a sub-matrix representing the product of multiplying matrices A and B, as well as a checksum row and checksum column. As part of ABFT for matrix multiplication, the checksum values in the checksum row and column of matrix C are compared with the result of performing the same linear operation on matrices A and B, but now on the sub-matrix of C. If the result of performing the linear operation on a row or column of the sub-matrix of C does not match the corresponding checksum value in C, then the mismatch indicates an error has occurred during matrix multiplication.

BRIEF SUMMARY

Aspects of the disclosure are directed to a computation unit implementing a systolic array and configured for detecting errors while processing data on the systolic array. Checksum circuit in communication with a systolic array is configured to compute checksums and perform error detection while the systolic array processes input data. Instead of pre-generating checksums in input matrices, input matrices can be directly fed into the systolic array through the checksum circuit. On the output side, the checksum circuit can generate a checksum for an output to the systolic array, when the systolic array finishes a corresponding operation to generate the output, or while the output is streamed from the systolic array.

Aspects of the disclosure provide for a number of technical advantages. Error detection through checksums on operands and output of a systolic array can be performed without pre-processing to generate checksums on the inputs, or post-processing operations to compare the checksums for correctness. A systolic array on a chip can be tested rapidly and according to a variety of random or pseudo random testing patterns, to determine whether hardware faults exist in the array or in an individual processing element of the array. No known input or output is required, and no signature for pseudorandom testing is necessary, allowing for many different test patterns to be generated and deployed as desired for testing.

At run time, the processor as implemented according to aspects of the disclosure can detect soft errors or hard errors, e.g., errors not caused by hardware defects, and errors that are caused by hardware defects. Rapid identification of errors can be particularly important when the processor is part of an accelerator performing critical and time-sensitive tasks. For example, soft error detection can be particularly important when the processor is processing input for a machine learning model trained to perform tasks related to banking, autonomous vehicle navigation/control, airplane or spacecraft navigation, etc.

In some examples, a computation unit as described herein can be configured to detect timing violation errors, which can be detected and addressed to provide better energy efficiency to a systolic array. Circuitry for performing error detection can be implemented to reduce the chance of timing errors, enabling accurate error detection to continue even while the systolic array operates on supplied voltage below a predetermined critical voltage. Aspects of the disclosure also provide for detecting errors in some types of operations, including matrix multiplication, which can be corrected to improve accuracy and reliability of the processor. Different computation units can be tuned to different voltage and/or frequency levels, to tune the units for better performance, e.g., during inference of a machine learning model executed by the computation unit. Detecting errors can improve accuracy of computation overall.

Aspects of the disclosure can be implemented with minimal overhead and without affecting the performance of the systolic array of a computation unit. Pre-processing of inputs are not necessary, further improving the efficiency of error checking on the computation unit over other approaches in which input is preprocessed. In addition, input to the checksum circuits for performing error detection as described herein does not delay input to the systolic array for processing.

"Relaxed" fault tolerance can also be applied to further reduce overhead, and particularly software interaction with the computation unit, to only cases in which errors are actually detected. In some examples, relaxed fault tolerance can be beneficial when the primary use case is to detect the existence of an error without needing to pinpoint the exact source of the error.

With the error detection applied to the computation unit as described herein, error correction mechanisms, e.g., error correction processes based on ABFT for matrix multiplication, can be implemented to recover from detected hard errors during run-time of the computation unit.

An aspect of the disclosure is directed to a computation unit including: a two-dimensional systolic array of processing elements, the systolic array configured to receive first input elements from a first input matrix along a first direction of the systolic array, and receive second input elements from a second input matrix along a second direction of the systolic array; a first checksum circuit configured to generate one or more groups of first checksums from the first input elements while the systolic array receives the first input elements; a second checksum circuit configured to generate one or more groups of second checksums while the systolic array receives the second input elements; the systolic array further configured to generate an output matrix from the first input matrix, the second input matrix, the one or more groups of first checksums, and the one or more groups of second checksums; and an output checksum circuit configured to receive the output matrix, and determine, from the output matrix, the occurrence of one or more errors in the generation of the output matrix.

The foregoing aspect can include one or of the following features, alone or in any combination. In some examples, the foregoing aspect includes all the following features, together.

The output matrix includes a data sub-matrix including values generated by the systolic array using the first input elements and the second input elements, an output checksum row, and a output checksum column; and wherein to determine the occurrence of one or more errors in the generation of the output matrix, the output checksum circuit is configured to: generate, from at least one row of the data sub-matrix, a row checksum; compare the row checksum with a checksum in the output checksum column; and determine, from the comparison of the row checksum and the checksum in the output checksum column, the occurrence of an error in the generation of the output matrix.

To determine the occurrence of one or more errors in the generation of the output matrix, the output checksum circuit is further configured to: generate, from at least one column of the data sub-matrix, a column checksum; compare the column checksum with a checksum in the output checksum row; and determine, from the comparison of the column checksum and the checksum in the output checksum row, the occurrence of an error in the generation of the output matrix.

To determine the occurrence of one or more errors in the generation of the output matrix, the output checksum circuit is further configured to: generate, from at least one row of the data sub-matrix, a row checksum; compare the row checksum with a checksum in the output checksum column; and determine, from the comparison of the row checksum and the checksum in the output checksum column, the occurrence of an error in the generation of the output matrix.

To compare the row checksum with the checksum in the output checksum column, the output checksum circuit is further configured to determine whether the absolute difference between the row checksum and the checksum in the output checksum column are within a predetermined threshold.

The computation unit further includes one or more checksum processing elements configured to receive checksums from one or both of the first and second checksum circuits.

One or both of the first and second checksum circuits are configured to send first or second checksums to the systolic array for processing, based on a control signal.

The timing of the control signal to the one or both of the first and second checksum circuits is based on the number of time steps to load first or second input values across the systolic array.

The computation unit is further configured to send, in response to the determination of the occurrence of one or more errors in the generation of the output matrix, an indication of the occurrence of one or more errors to one or more devices connected to the computation unit.

The systolic array is further configured to receive: after the indication of the occurrence of one or more errors is sent, receive, from the one or more devices, an adjusted voltage, the adjusted voltage higher than a critical voltage for the computation unit.

The systolic array is further configured to receive a first voltage lower than the critical voltage for the computation unit, until receiving the adjusted voltage in response to sending the indication.

One or both of the first and second checksum circuits are configured to receive a second voltage higher than the critical voltage.

One or both of the first and second checksum circuits includes 2-input 2-stage pipelined adder circuits configured to delay the generation of one or both of the first and second checksums.

One or both of the first and second checksum circuits includes: one or more 2-cycle adder circuits and, a plurality of registers, the plurality of registers including one or more first registers configured to receive and send data according to a first clock frequency, one or more second registers configured to receive and send data according to a second clock frequency, and one or more third registers configured to receive and send data according to a third clock frequency, wherein the first, second, and third clock frequency are all different frequencies.

In some examples, the systolic array is weight stationary. In other examples, the systolic array is an output stationary systolic array, and both the first and the second checksum circuits are connected to a plurality of checksum processing elements, the checksum processing elements configured to receive generated checksums from one or both of the first and second checksum circuits.

The plurality of checksum processing elements are arranged along a periphery of the systolic array.

The computation unit is configured to generate checksums only from the first checksum circuit, or generate checksums only from the second checksum circuit.

An aspect of the disclosure is directed to a data processing system, the data processing system including one or more processors, one or more memory devices, and a computation unit including: a two-dimensional systolic array of processing elements, the systolic array configured to receive first input elements from a first input matrix along a first direction of the systolic array, and receive second input elements from a second input matrix along a second direction of the systolic array; a first checksum circuit configured to generate one or more groups of first checksums from the first input elements while the systolic array receives the first input elements; a second checksum circuit configured to generate one or more groups of second checksums while the systolic array receives the second input elements; the systolic array further configured to generate an output matrix from the first input matrix, the second input matrix, the one or more groups of first checksums, and the one or more groups of second checksums; and an output checksum circuit configured to receive the output matrix, and determine, from the output matrix, the occurrence of one or more errors in the generation of the output matrix.

The foregoing aspects can include one or more of the following features, alone or in combination. In some examples, the foregoing aspects can include all of the following features together.

The data processing system is configured to: apply voltage to the systolic array, the applied voltage below a critical voltage of the systolic array; and receive an indication from the computation unit of one or more errors, and in response, increase the applied voltage higher than the critical voltage of the systolic array.

The data processing system is further configured to apply voltage below the critical voltage of the systolic array to one or more of the first checksum circuit, the second checksum circuit, and the output checksum circuit; and in response to receiving the indication, continue applying voltage below the critical voltage to one or more of the first checksum circuit, the second checksum circuit, and the output checksum circuit.

The data processing system is configured to send a control signal to the one or both of the first and second checksum circuit, wherein the timing of the sending is based on the number of time steps to load first or second input values across the systolic array.

An aspect of the disclosure is directed to one or more non-transitory computer-readable storage media encoded with computer instructions that when executed by a computation unit including a two-dimensional systolic array of processing elements, a first checksum circuit, a second checksum circuit, and an output checksum circuit, cause the computation unit to perform operations including: receiving, by the systolic array, first input elements from a first input matrix along a first direction of the systolic array, receiving, by the systolic array, second input elements from a second input matrix along a second direction of the systolic array; generating, by the first checksum circuit, one or more groups of first checksums from the first input elements while the systolic array receives the first input elements; generating, by the second checksum circuit, one or more groups of second checksums while the systolic array receives the second input elements; generating, by the systolic array, an output matrix from the first input matrix, the second input matrix, the one or more groups of first checksums, and the one or more groups of second checksums; receiving, by the output checksum circuit, the output matrix; and determining, by the output checksum circuit and from the output matrix, the occurrence of one or more errors in the generation of the output matrix.

DETAILED DESCRIPTION

Figure 1:
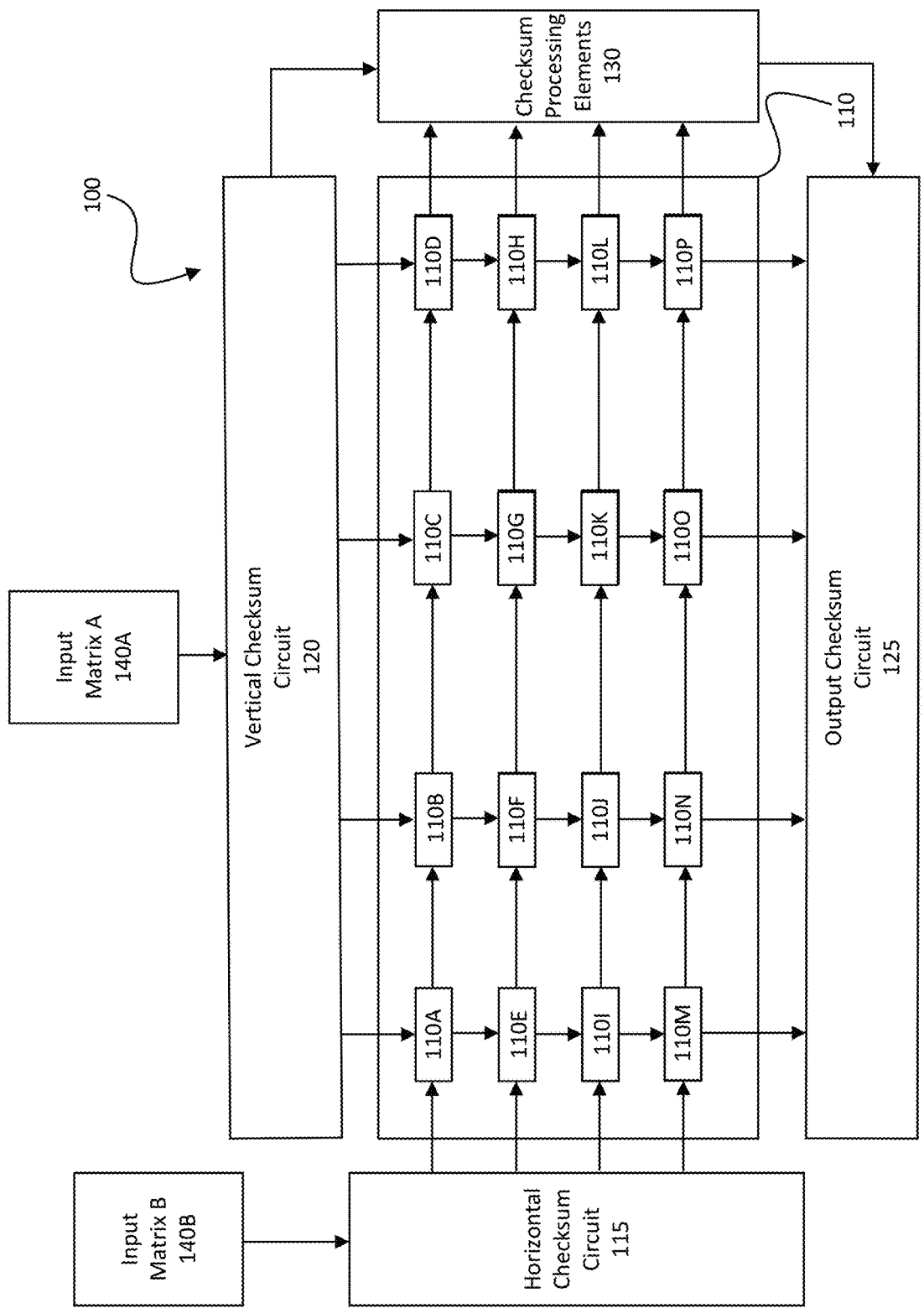
FIG. 1 is a block diagram of a computation unit, according to aspects of the disclosure.

FIG. 1 is a block diagram of a computation unit 100, according to aspects of the disclosure. The computation unit 100 includes a systolic array 110 of processing elements 110A-P, a horizontal checksum circuit 115, a vertical checksum circuit 120, output checksum circuit 125, and checksum processing elements 130.

The systolic array 110 can be implemented in a variety of different ways, and in general can include one or more data buses or interconnects connecting different processing elements to neighboring processing elements. For example, the systolic array can include data buses along each row and/or column of the systolic array 110, whose processing elements 110A-P can be configured in a square or rectangular arrangement (although the processing elements 110A-P can be configured in other geometric arrangements in some examples, such as a hexagonal arrangement). In some examples, the systolic array 110 can include one or more data buses along processing elements positioned diagonally up or down relative to one another in the array. In some examples, the systolic array 110 can implement two-phase non-overlapping clocks and latches, to leverage time borrowing.

The data buses allow data to flow from processing element to processing element, or from an external input to a processing element, or from a processing to an external output. External inputs and output can include, for example, other devices communicatively coupled to the computation unit 100, or memory devices that are part of the computation unit 100 or located externally from the unit 100. In some examples, the systolic array 110 can be configured to receive or generate input or output external to the systolic array 110 only through processing elements on the periphery of the systolic array 110. In other examples, the systolic array 110 can be configured to receive or generate external input or output from any of the processing elements 110A-P.

A processing element of the systolic array 110 can be a processor, a microprocessor, or any specialized circuit configured to receive one or more inputs, process the input(s), and generate one or more outputs. The processing elements can be, for example, data processing units (DPUs), configured to perform a particular type of operation. In some examples, a processing element can be configured to temporarily store memory, e.g., in a register, or using one or more circuits, such as latches or flip/flop circuits.

The processing elements 110A-P can be arranged according to a number of topologies. For example, the processing elements 110A-P can be arranged as an array, a mesh, or a cube. Each processing element can have one or more channels connecting it to a neighboring processing element. The one or more channels can be wires or other physical connections, e.g., on a silicon wafer on which the systolic array 110 is implemented. Depending on the number of channels for each processing element, the systolic array 110 can have one or more dimensions. For purposes of description, the systolic array 110 is assumed to be a two-dimensional mesh, although it is understood that in other implementations the systolic array 110 can be configured according to other topologies without loss of generality.

Although sixteen processing elements are shown in the systolic array 110 and arranged as a 4 by 4 mesh, it is understood that in various examples the number of processing elements of the systolic array 110 can vary, e.g., 65,536 processing elements arranged as a 256 by 256 mesh, or 16,384 processing elements arranged in a 128 by 128 mesh.

Data can travel across each data bus or interconnect of the systolic array 110 independent of one another. In other words, different processing elements may receive and transmit different data to a neighboring processing element at different points in time, measured for example in time steps. A time step can refer to one or more clock cycles of the computation unit 100 or a larger system communicatively coupled to the computation unit 100. For ease of description in this specification, a time step in this specification will refer to a single clock cycle unless otherwise indicated. For each time step, each processing element 110A-P may be performing a different operation. For example, in a single time step, some processing elements may be receiving new input, sending generated output, processing received input, or be idle for lack of data to receive or send.

The function of the processing elements 110A-P can depend on the function of the systolic array 110, e.g., the operations the systolic array 110 is configured to perform. For example, the systolic array 110 may be configured for performing matrix multiplication on two input matrices, e.g., a weight matrix for a neural network layer and an input matrix to that layer. In other examples, the systolic array 110 can be configured to perform a convolutional operation as part of received input for a convolutional neural network ("ConvNet"). In the example of matrix multiplication, each processing unit 110A0P can be configured to perform a multiply-and-accumulate ("MAC") operation. Processing elements configured to perform MAC operations can be referred to as MAC units. Aspects of the disclosure are directed to error checking and correction during matrix multiplication performed by a systolic array of MAC units, and the following examples will assume that the processing elements 110A-P are configured for MAC operations, unless otherwise indicated.

As an example, a processing element configured as a MAC unit can be process data as follows: For each time step, the processing element can multiply a matrix element loaded in the unit with an incoming input matrix element, and add the product of the multiplication to a running partial sum maintained by the MAC unit. The MAC unit can forward the input matrix element to a neighboring MAC unit along a data bus in a first direction (e.g., to the right), and pass the updated partial sum to a MAC unit along a same or different data bus in a second direction (e.g., down).

The systolic array 110 can be configured to perform operations with varying levels of pipelined sub-operations, differently-sized inputs, debugging, etc. For example, one operation on the systolic array 110 may be defined by operations individually performed by a group of processing elements, e.g., sub-arrangements of 2 by 2 or 4 by 4 processing elements. In other examples, the systolic array 110 can be configured to perform more complex operations, such as discrete Fourier Transforms, or define different control flows governing how data is input and output to the systolic array 110. The systolic array 110 can also perform operations, such as matrix multiplication, on blocks of input that are part of larger matrices the systolic array 110 is tasked to multiply. In other examples, different processing units of the systolic array 110 can be implemented with different types of circuits or combinations of circuits, e.g., adders, multipliers, accumulators, circuits configured to compare two inputs, etc.

Although the examples in this specification focus on algorithm-based fault tolerance for matrix multiplication on the systolic array 110, it is understood that aspects of the disclosure are applicable for error detection on systolic arrays configured to perform other types of operations under any of a variety of conditions, e.g., including those operations and conditions described herein.

The systolic array 110 is configured to perform matrix multiplication on input matrices having different data types for their respective elements. For example, the systolic array 110 can perform matrix multiplication on binary matrices having 1's and 0's as elements; integer matrices having positive or negative integers as elements; and floating-point matrices having floating point values as elements, etc. The elements can be of different levels of precision, e.g., 8-bit integers, or floating-point values are different ranges and levels of precision, etc.

As described in more detail herein, the vertical checksum circuit 120 and the horizontal checksum circuit 115 are configured to generate checksums for incoming input matrices 140A, B. The reference to a "vertical" and "horizontal" checksum circuit is not intended to be limiting to the orientation of input received by the systolic array 110, but merely provided for ease of description in conjunction with the orientation of the input matrices to the example circuits as shown in the Figures. In some examples, the vertical checksum circuit 120 as described herein can be oriented so as to provide input to the systolic array 110 along columns of the array instead of columns, and vice versa for the horizontal checksum circuit 115 and rows of the array instead of columns. The checksum circuits 115, 120 can be arranged in any direction relative to one another to provide input to the systolic array 110.

The checksum processing elements 130 include additional processing elements for storing checksums generated for each column of the input matrix A 140A. As each column is processed by the vertical checksum circuit 120, resulting checksums are pushed to the checksum processing elements 130, which can be communicatively coupled to the systolic array 110 and included during multiplication of the input matrices 140A-B that are augmented with their respective checksum column or row by the checksum circuits 115, 120. The orientation and position of the checksum processing elements 130 can also vary relative to the orientation and position of the vertical checksum circuit 120, as described in more detail herein.

The output checksum circuit 125 is configured to generate a checksum for a resulting output matrix, which is the product of the systolic array 110 multiplying the input matrix A 140A (and its checksum) with the input matrix 140B (and its checksum). The output matrix includes a sub-matrix that is the product of multiplying the input matrix A and input matrix B, along with a checksum column and checksum row generated by the output checksum circuit 125. The output checksum circuit 125 compares the checksum column and row with the sum of a respective column or row of the sub-matrix, and is configured to detect errors indicated by a discrepancy between the checksum value and the compared computed sum.

Figure 2:
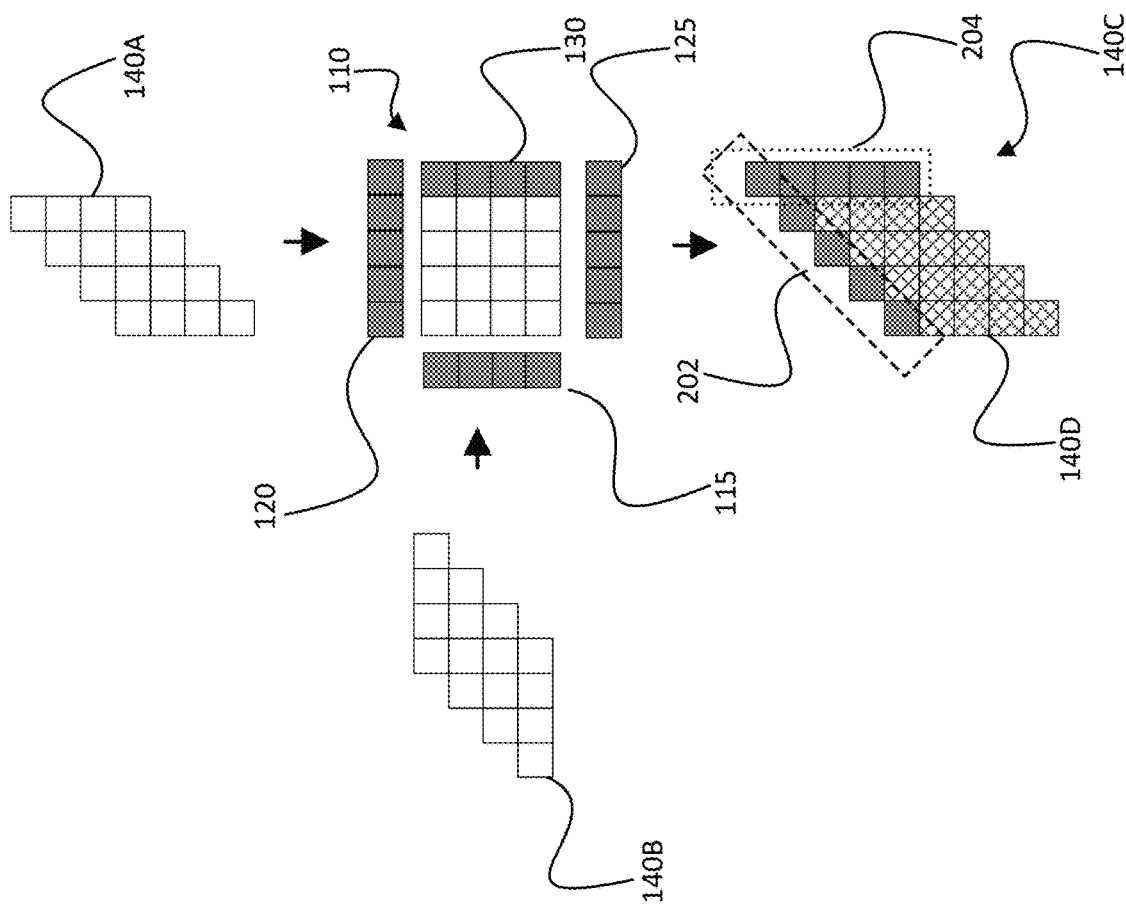
FIG. 2 illustrates example input matrices processed by the computation unit to generate a respective output matrix with corresponding checksums, according to aspects of the disclosure.

FIG. 2 illustrates example input matrices 140A, B processed by the computation unit 100 to generate a respective output matrix 140C with corresponding checksums, according to aspects of the disclosure.

In this example, the input matrix A 140A ("matrix A") is multiplied by the input matrix B 140B ("matrix B"), which can be represented as: A×B. In FIG. 2, the input matrices are 4 by 4, matching the dimensions of the systolic array 110. In other examples, the input matrices can vary in dimension. For example, matrix A can be n by 4, and matrix B can be 4 by m, where n, m are positive integers. As described herein, the systolic array 110 can be of arbitrary dimension, and accordingly the inner dimension of the matrices A and B (four, in this example), can also vary based on the dimensions of the systolic array 110.

Based on the example orientation and position of the checksum circuits 115, 120, the input matrix A 140A ("input matrix A") and the input matrix B 140B ("input matrix B") are first manipulated to ensure that the order in which elements of the matrices are received by the systolic array 110 allows for correct multiplication per the rules of matrix multiplication. A sequencer configured as part of a data processing system implementing the computation unit 100 can be implemented to perform some or all of the operations described presently in relation to manipulating the matrices A, B, and adjusting the timing by which elements of the input matrices are provided to the systolic array 110. The sequencer and other components of an example data processing system are described herein with reference to FIG. 10A.

The input matrix A is transposed ($A^T$) and each of its columns are staggered by one time step, e.g., one clock cycle. Time steps can define one or more clock cycles or periods of time, which can be managed by timing circuitry, e.g., timing circuitry as described herein with reference to FIG. 10A. Each column of the transposed matrix $A^T$ passes through a respective processing element of the vertical checksum circuit 120. As described herein with reference to FIG. 3, the vertical checksum circuit 120 generates a checksum for each column of the transposed matrix $A^T$ (each of which corresponds to a row in the original input matrix A). After the vertical checksum circuit 120 processes a received element of the transposed matrix $A^T$, the vertical checksum circuit 120 passes the received element to the systolic array 110 for performing matrix multiplication. The generated checksums are also pushed to the checksum processing elements 130.

The computation unit 100 can be configured to receive input matrices of different block sizes. The computation unit 100 may receive multiple matrices that are sub-matrices of larger input. For example, the computation unit 100 may be 128 by 128 elements and can be configured to do blocked matrix multiplication, where the original input matrices are large, e.g., 4,096 by 4,096 elements. The "A" input matrices can be 128 by 128 elements, and the "B" input matrices to the computation unit 100 can be 1024 by 128 elements.

The input matrix B is also pre-processed before its elements are received by the horizontal checksum circuit 115. The input matrix B is reversed (Br) so that the position of each element in each row is swapped, e.g., the first element as the last element, the second element as the second-to-last element, etc. The reversed matrix Br is also staggered by one time step for each row. As described herein with reference to FIG. 4, the horizontal checksum circuit 115 generates a checksum for each row of the reversed matrix Br. After the horizontal checksum circuit 115 processes a received element of the reversed matrix Br, the horizontal checksum circuit 115 passes the received element to the systolic array 110 for performing matrix multiplication.

In some examples, elements of the matrix A or elements of the matrix B are loaded into the systolic array 110, e.g., one element loaded in a respective processing element of the systolic array 110, and then elements of the other matrix are streamed into the systolic array 110. For example, the input matrix A may be a weight matrix corresponding to weights of a layer of a neural network, while input matrix B may include input values for multiplying by the weights of the neural network layer. Elements of the matrix A may be loaded into the systolic array 110, e.g., by latching or weight loading, and elements of the matrix B can be streamed into the systolic array 110 for processing. The choice of streaming or loading elements of the input matrices can depend on the dimensions of the input matrices, e.g., wider or taller matrices can be streamed into the systolic array, while matrices that fit in the systolic array 110 can be loaded. Output matrix C 140C ("matrix C") can be streamed out of the systolic array 110, or in some examples, be pushed completely out of the systolic array 110 only after multiplication is complete.

After a number of time steps have passed, e.g., based on the configuration and number of processing elements of the systolic array for performing matrix multiplication, the output checksum circuit 125 begins to receive elements of the matrix C. Because the input matrices A and B were staggered, the elements of matrix C will also be staggered. In some examples, however, the systolic array 110 may be configured as an output stationary systolic array, in which elements of the output matrix C remain in the systolic array 110 until multiplication is complete, and is only popped out afterwards through the output checksum circuit 125. As described in more detail with reference to FIG. 5, the output checksum circuit 125 generates checksums for the output matrix, and compares those values with the checksums from the output matrix C. If the generated checksums do not match the checksums of the output matrix C, then the output checksum circuit 125 can raise a flag or other indication, indicating that an error has been detected.

The output matrix C has two parts: a data sub-matrix and a checksum part. The checksum part of the output matrix C is indicated by the elements of the periphery of the output matrix C, shown by a dashed outline for the checksum row 202 of the output matrix C, and a dotted outline for the column checksum 204. The data sub-matrix 140D of the checksum matrix is indicated by the cross-thatched elements. The data sub-matrix 140D corresponds to the product of the input matrices A and B, without the added checksums. The overall output matrix C (element 140C) with checksum row 202, the column checksum 204, and the data sub-matrix 140D corresponds to the product of the matrices A and B with their respective checksum row or column as generated by the horizontal and vertical checksum circuit 115, 120.

Note that the checksums in the row and column 202, 204 share a common element, denoted by the element in the upper right-hand corner of the output matrix C. The checksums in the row and column 202, 204 for the output matrix C can be discarded after the output checksum circuit 125 performs the checksum generation and comparison.

Overall, the introduction of the horizontal, vertical, and output checksum circuits adds low additional cost or no additional cost in terms of increased time steps, i.e., the additional time step(s) necessary to pass inputs to the systolic array 110 in the case of the horizontal/vertical checksum circuits, or to pass the output elements from the systolic array 110 to its respective destination from the output checksum circuit 125. The additional logic necessary also scales linearly relative to a two-dimensional systolic array, e.g., increasing only in the length of the dimensions of the array, instead of the number of processing elements in the array.

Figure 3:
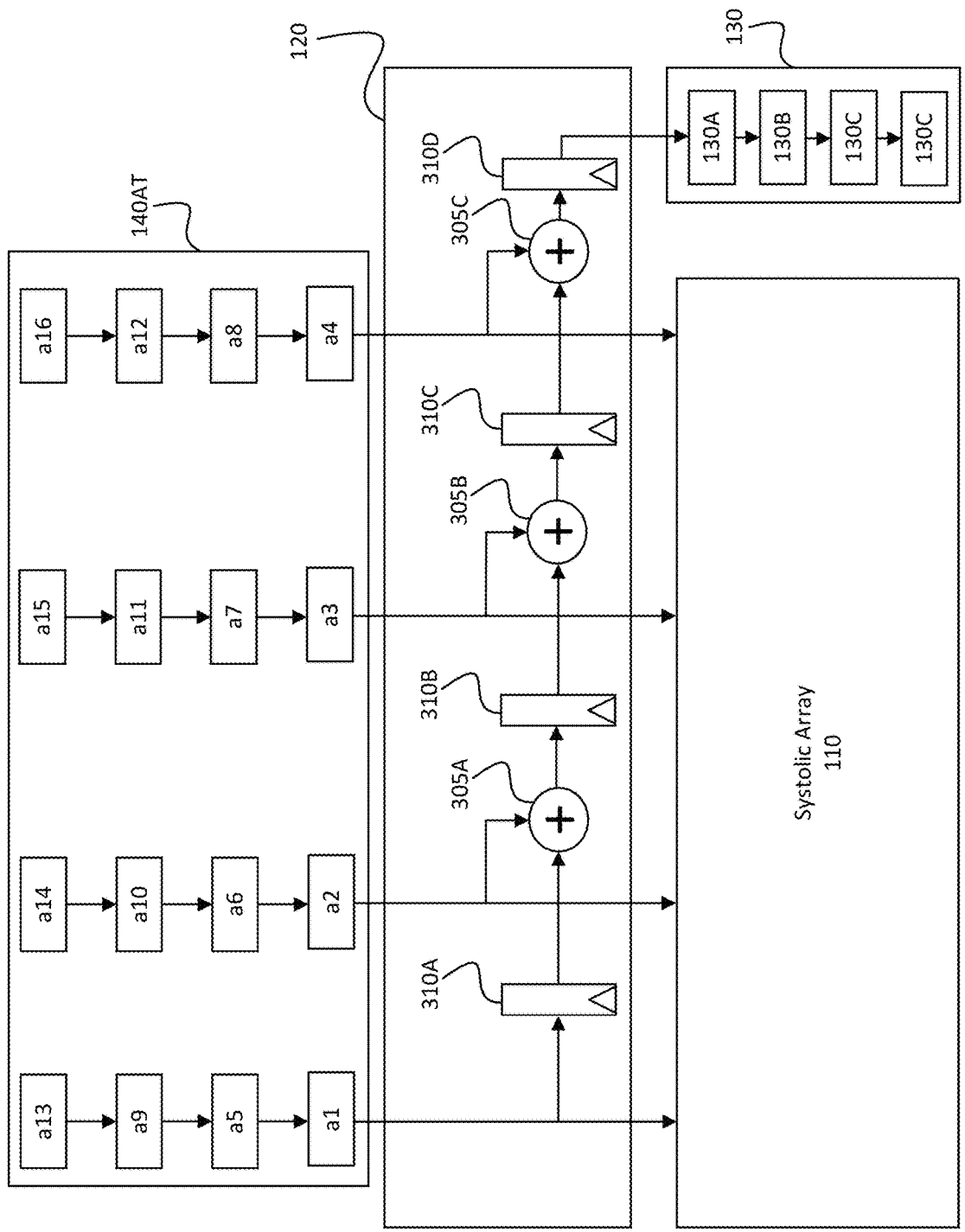
FIG. 3 is a block diagram of the vertical checksum circuit and the checksum processing elements.

FIG. 3 is a block diagram of the vertical checksum circuit 120 and the checksum processing elements 130. The checksum processing elements 130 include checksum processing elements 130A, B, C, and D, which can be configured similar to the processing elements of the systolic array 110. In some examples, the error checking functionality provided by the vertical checksum circuit 120 can be disabled, e.g., based on user input. In some cases, the checksum processing elements 130 can be used as part of performing matrix multiplication on the systolic array 110, even when error checking is disabled.

The vertical checksum circuit 120 includes a number of adder circuits 305A, B, and C ("adder circuits 305"); as well as registers 310A, B, C, and D ("registers 310"). The registers 310 can be implemented according to any of a variety of techniques for storing data on a circuit, e.g., as a respective group of flip/flop circuits. The adder circuits 305 can be implemented according to any of a variety of techniques for building circuits configured to receive two inputs, and to generate a resulting sum of the two inputs. The number of adder circuits 305 varies depending on the length of the row input of an input matrix. The example provided herein focuses on 4 by 4 input matrices, therefore the vertical checksum circuit 120 includes three adder circuits and four registers.

The vertical checksum circuit 120 receives the input matrix A, which as described in FIG. 2 is transposed and staggered by one time step ($A^T$). The inputs for the first row are received by the input matrix $A^T$ (indicated in FIG. 3 as input matrix 140AT). The first row of the input matrix 140AT corresponds to the first column of the input matrix A. The input matrix 140AT includes elements a1, a2, a3, a4, a5, a6, a7, a8, a9, a10, a11, a12, a13, a14, a15, and a16.

In general, the vertical checksum circuit 120 accumulates partial sums of checksums in registers 310A-C, and stores calculated checksums in register 310D, before pushing the checksums to the checksum processing elements 130. Because the inputs are staggered, at a first time step, the vertical checksum circuit 120 receives input a1. Input a1 is stored in register 310A, and is also passed to the systolic array 110 for processing, i.e., matrix multiplication according to a matrix multiplication algorithm on a systolic array.

At the second time step, the input a1 and the input a2 are received by the adder circuit 305A. The partial sum of a1+a2 is stored in register 310B. The input a2 is also passed to the systolic array 110. Although not shown in FIG. 3, also at the second time step the next input a5 above a1 is stored at the register 310A, and is also passed to the systolic array 110.

At a third time step, the adder circuit 305B adds the partial sum stored in the register 310B, with the input a3. The updated partial sum generated by the adder circuit 305B is stored in register 310C. The input a3 is also passed to the systolic array 110. Also, a next input in the same column as a1 (input a9) is passed to the register 310A, and the previous contents of the register 310A is added to the next input a6 in the same column as a2, and stored in the register 310B.

At a fourth time step, the adder circuit 305C adds the partial sum stored in the register 310C, with the input a4. Because the adder circuit 305C is the last adder, it generates the checksum for the first column of A (i.e., the first row of $A^T$). The checksum is stored in register 310D. Input a4 is also passed to the systolic array 110, and successive input (a7) in the input matrix A are passed to the systolic array 110 and added to update respective partial sums across the registers 310A-C.

At a fifth time step, the checksum stored in the register 310D is pushed down into the last available processing element of the checksum processing elements 130. For example, the checksum generated for the first column of the input matrix A (inputs a1-a4) is pushed to the processing element 130D. Also at the fifth time step, the input a8 is pushed and the checksum for the second column of the input matrix A can be calculated and stored in the register 310D. On subsequent time steps, the checksum for the second column (inputs a5-a8) is pushed to the processing element 130C, and then a third checksum for the third column (inputs a9-a12) in the processing element 130B, and the checksum for the fourth column (inputs a13-a16) are pushed to the checksum processing element 130A.

After the checksums are generated for the input matrix A, the systolic array 110 can use the checksums stored in checksum processing elements 130, e.g., by multiplying each checksum with a corresponding row of the input matrix B, to generate the output matrix C with its corresponding row and column of checksums.

Although the preceding example described generating the checksum for the columns of the input matrix A by summing the elements of each row of the transposed matrix $A^T$, it is understood that the vertical checksum circuit 120 can be configured to perform any linear operation for generating a checksum, e.g., adding and multiplying by a constant value or factor, or multiplying the checksum row by a predetermined vector.

Figure 4:
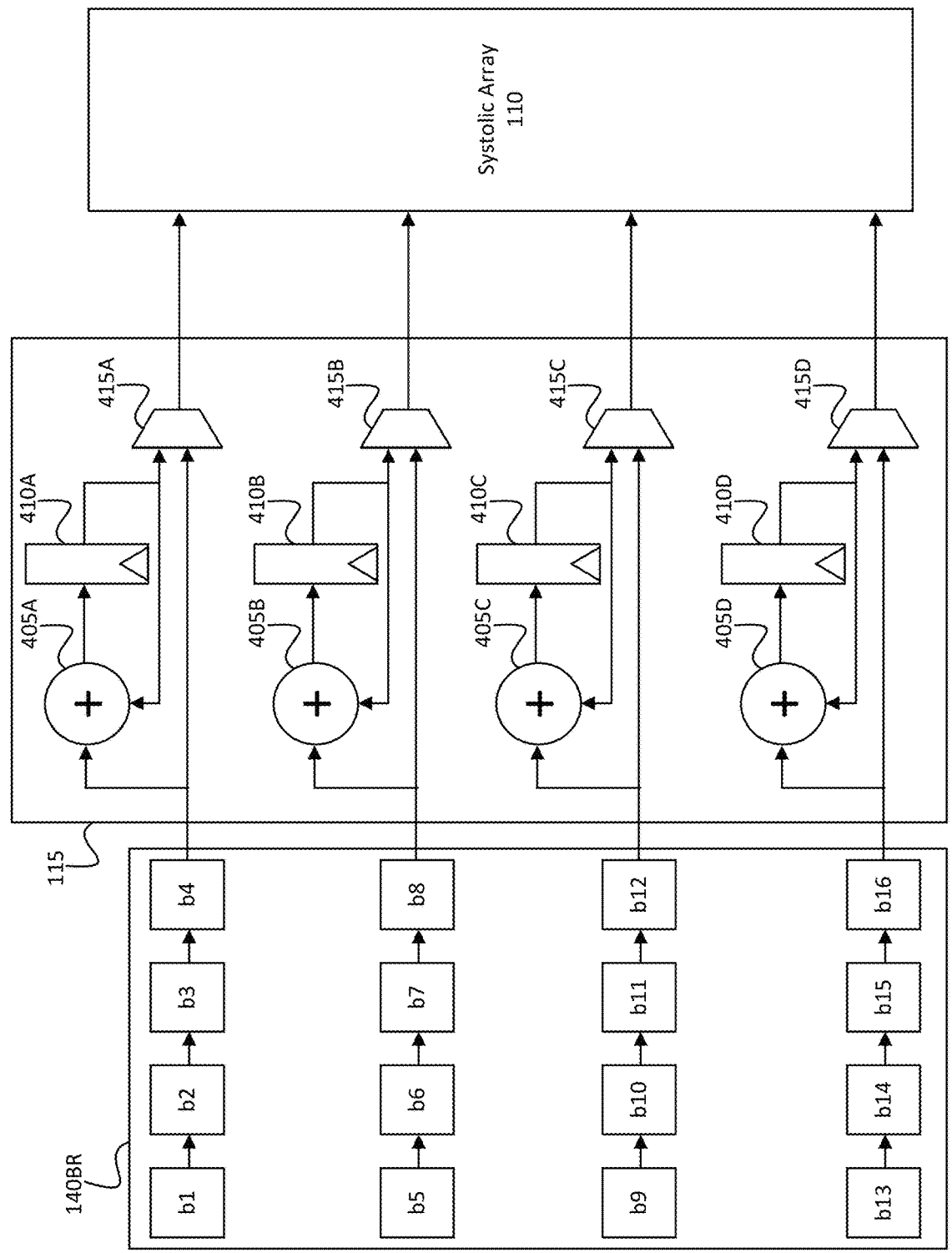
FIG. 4 is a block diagram of the horizontal checksum circuit. The horizontal checksum circuit 115 includes a number of adder circuits, registers, and multiplexers.

FIG. 4 is a block diagram of the horizontal checksum circuit 115. The horizontal checksum circuit 115 includes a number of adder circuits 405A-D ("adder circuits 405"); registers 410A-D ("registers 410A-D"); and multiplexers 415A-D ("multiplexers 415"). The adder circuits 405 and the registers 410 can be implemented as described herein with reference to the adder circuits 305 and the registers 310 shown in FIG. 3. The multiplexers 415 can be 2-to-1 multiplexers, configured to pass either a value in a corresponding register or a corresponding input value to the systolic array 110. The multiplexers can be substituted with any variant of decision making circuitry, such as a switch, or one or more circuits controlled by one or more control signals to disable and enable certain parts of the horizontal checksum circuit 115, configured to select between multiple inputs and gate the unselected inputs.

The horizontal checksum circuit 115 receives the input matrix B, which as described in FIG. 3 is reversed and staggered (Br). For ease of description, the inputs are presented in ascending order. The inputs for the first column received by the input matrix Br (i.e., the inputs for the last column of the input matrix B) include elements b1, b2, b3, b4, b5, b6, b7, b8, b9, b10, b11, b12, b13, b14, b15, and b16.

In general, the horizontal checksum circuit 115 accumulates partial sums of checksums in registers 410A-D, and based on a control signal, determines when to push the contents of the registers 410A-D as completed checksums to the systolic array 110. For example, a control signal, e.g., an is_checksum flag, can be propagated from the multiplexer 415A to the multiplexer 415D, based size of the inner dimension of the input matrix A. As described herein, the input matrix B can be much longer (e.g., n by 4), then the input matrix A (e.g., 4 by m). Therefore, checksums are generated over segments of the input matrix B, and are sent to the systolic array 110 periodically. The control signal allows the horizontal checksum circuit 115 to determine when data passed to the systolic array 110 is a regular input from the matrix B, or a generated checksum. Based on the control signal, the horizontal checksum circuit 115 can pass the checksum and reset the accumulation of partial sums for a new set of inputs from the matrix B. The control signal can be provided automatically by a sequencer communicatively coupled to the computation unit 100, and/or programmatically provided by software containing instructions performed by the computation unit 100 to perform the matrix multiplication on the input matrices A and B.

For example, until receiving the control signal, the multiplexer 415A is configured to pass inputs from the input matrix B to the systolic array 110. When the control signal is received, the multiplexer 415A instead passes the content of the register 410A to the systolic array 110 for processing. The timing of the control signal to the multiplexer 415A should coincide with the completion of a checksum of a corresponding row of the input matrix A. For example, the control signal can be passed to the multiplexer 415A after the appropriate number of time steps to receive and accumulate each input of a row in the input matrix B has passed. An example breakdown of operations performed time step by time step for the horizontal checksum circuit 115 follows.

Because the inputs are staggered, at a first time step, the horizontal checksum circuit 115 receives input b13. The input b4 is added to the contents of the register 410A, i.e., zero, as the register 410A is initially empty. The multiplexer 415A checks for a control signal, and in the absence of the control signal passes the input b4 to the systolic array 110.

In a second time step, the horizontal checksum circuit 115 receives input b8. The input b8 is added to the contents of the register 410B, i.e., zero, as the registered 410B is initially empty. The multiplexer 415B checks for a control signal, and in the absence of the control signal passes in the input b8 to the systolic array 110. At the same time step, the horizontal checksum circuit 115 also receives the next input b3 following b4.

In a third time step, the horizontal checksum circuit 115 receives input b12. The input b12 is added to the contents of the register 410C. The horizontal checksum circuit 115 also receives successive inputs from the higher rows of the input matrix B, adding respective received input to the respective partial sums stored in the registers 410A-C. The horizontal checksum circuit 115 also receives input b7 and b2.

In a fourth time step, the horizontal checksum circuit 115 receives input b16. The input b16 is added to the contents of the register 410D and is passed to the systolic array by the multiplexer 415D. The horizontal checksum circuit 115 also receives inputs b11, b6, and b1.

Also during the fourth time step, the multiplexer 415A receives the control signal, indicating that the contents of register 410A is the checksum for the first row of the matrix B. At this time step, the register 410A includes the sum b4+b3+b2+b1. The multiplexer 415A pushes the checksum from the register 410A to the systolic array 110, to be included in the matrix multiplication operation. The register 410A is then reset to zero, to begin calculating the checksum for the next set of inputs. The control signal is pushed down to the next multiplexer, i.e., the multiplexer 415B.

In a fifth time step, the multiplexer 415B pushes the contents of the register 410B to the systolic array 110. By the fifth time step, the register 410B can include the sum b8+b7+b6+b5. The register 410B is cleared, and the control signal is pushed down to the next multiplexer, multiplexer 415C.

In a sixth time step, the multiplexer 415C pushes the contents of the register 410C to the systolic array 110. By the sixth time step, the register 410C can include the sum b12+b11+b10+b9. The register 410C is cleared, and the control signal is pushed down to the next multiplexer, multiplexer 415D.

In a seventh time step, the multiplexer 415D pushes the contents of the register 410D to the systolic array 110. By the seventh time step, the register 410D can include the sum b16+b15+b14+b13. The register 410D is cleared. In subsequent time steps, the horizontal control circuit 115 can generate new respective checksums for new groups of inputs from matrix B, at each of its rows.

In some examples, the vertical checksum circuit 120 is configured with multiplexers that manage whether inputs from the matrix A or a generated checksum are passed to the systolic array 110. For example, the vertical checksum circuit 120 may receive an input matrix that is much longer than what can be fit in the systolic array 110, and whose contents are instead streamed into the systolic array 110. In those examples, the checksum processing elements 130 are not used, or may be used by the horizontal checksum circuit 115 instead. For example, the checksum processing elements 130 may be used by the horizontal checksum circuit 115 when receiving an input matrix that is not streamed into the systolic array 110, but is instead loaded directly into the processing elements 110A-P. In those examples, the checksum processing elements 130 can be arranged as an additional row to the systolic array 110. In other examples, both the horizontal and the vertical checksum circuits 115, 120 can be configured with multiplexers as described herein, to handle streaming input. In some implementations, the specific orientation and position of the checksum circuits 115, 120, and the checksum processing elements 130 can vary based on the direction(s) in which the systolic array 110 is configured to receive input.

Although the preceding example described generating the checksum for the rows of the input matrix B by summing the elements of each row, it is understood that the vertical checksum circuit 120 can be configured to perform any linear operation for generating a checksum, e.g., adding and multiplying by a constant value or factor, or multiplying the checksum row by a predetermined vector. An additional consideration for the horizontal checksum circuit 115 is generating checksums that are valid inputs for the systolic array 110. While some data types, such as floating point, may have sufficient precision available to represent even very large sums of individual elements of an input matrix, the systolic array 110, for example, may be configured for matrix multiplication low-precision integer values, e.g., matrices having 8-bit quantized values. The calculated checksum by the horizontal checksum circuit 115 may require more precision than the inputs to the systolic array 110.

To address this potential issue without changing the hardware or configuration of the systolic array, in some examples, the horizontal checksum circuit 115 can be configured to generate checksums modulo some value, e.g., the maximum value supported by the systolic array 110. In other examples, Galois field arithmetic can be applied to make the precision necessary to represent the checksum the same as the precision to represent elements of the matrices being multiplied by the systolic array 110. In those examples, the horizontal checksum circuit 115 can be configured with additional circuitry configured for performing Galois field arithmetic.

Although the example operations by the horizontal and vertical checksum circuits are described as performed across successive time steps, it is understood that some delay or idle time steps may be inserted as needed for synchronizing the operation of the horizontal and vertical checksum circuits, with the operations performed by the processing elements of the systolic array 110.

Figure 5:
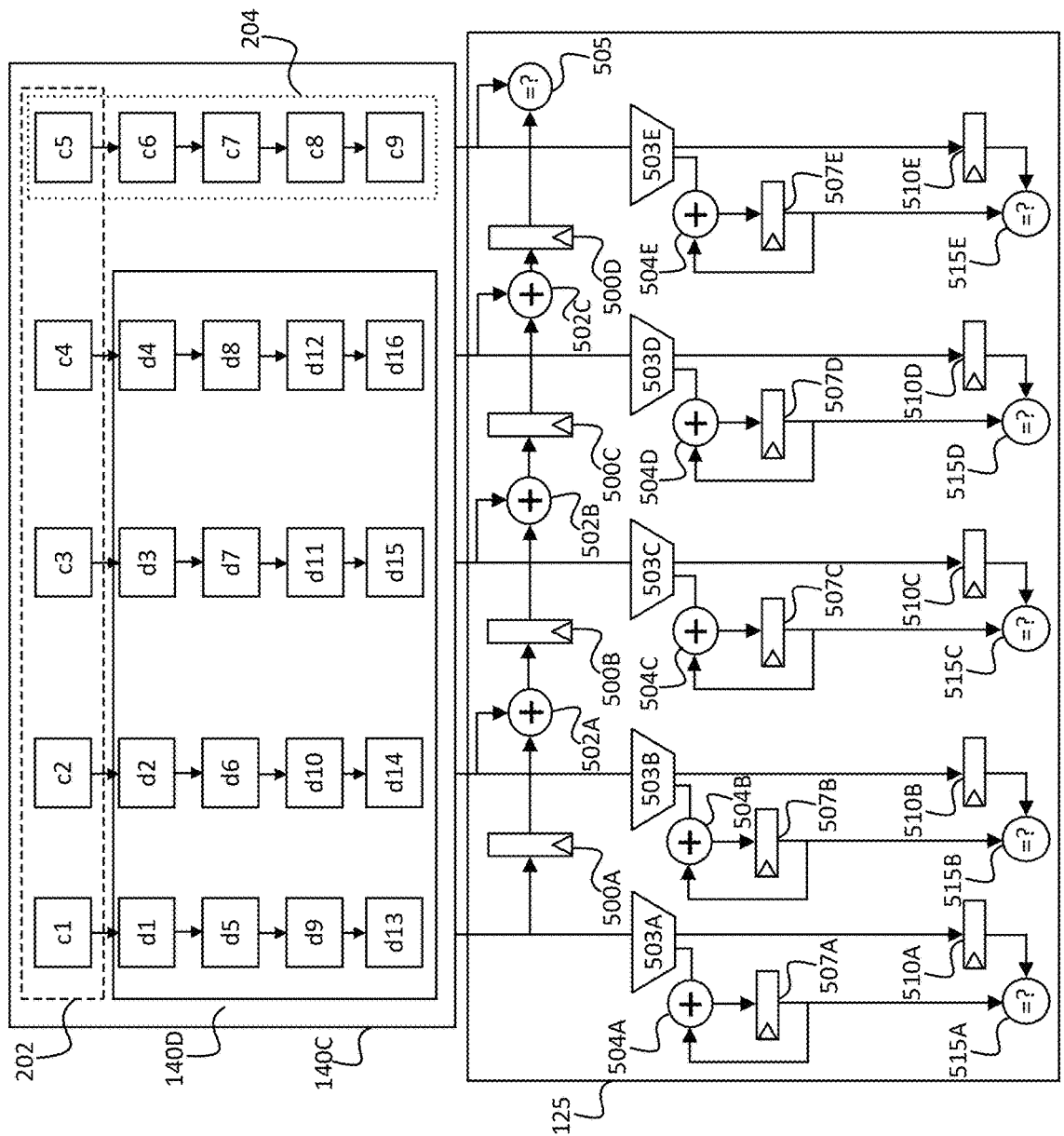
FIG. 5 is a block diagram of the output checksum circuit. The output checksum circuit is configured to generate a checksum from the rows and columns of the data sub-matrix of the output matrix C.

FIG. 5 is a block diagram of the output checksum circuit 140C. The output checksum circuit 140C is configured to generate a checksum from the rows and columns of the data sub-matrix 140D of the output matrix C. As described with reference to FIG. 2, the output matrix C includes a checksum row 202, a checksum column 204, and the data sub-matrix 140D, the latter of which corresponding to the product of the matrices A and B without the checksum row and checksum column generated by the horizontal and vertical checksum circuits. The data sub-matrix 140D has output elements d1, d2, d3, d4, d5, d6, d7, d8, d9, d10, d11, d12, d13, d14, d15, and d16. The checksum row 202 has checksums c1, c2, c3, c4, and c5. The checksum column 204 has checksums c5, c6, c7, c8, and c9.

The output checksum circuit 140C in some examples can be a combination of the horizontal and vertical checksum circuits 115, 120. Registers 500A-D and adder circuits 502A-C can be configured similarly to the adder circuits and registers of the horizontal checksum circuit 115.

Because the input matrices A and B are staggered before their respective elements are pushed to the systolic array 110, the input elements of output matrix C are also staggered as they are pushed out of the systolic array 110. The output checksum circuit 140C generates a checksum for each row of the output matrix C, and compares it with a corresponding checksum in the checksum column 204. For example, outputs d13, d14, d15, and d16 are passed through the registers 500A-D, and the adder circuits 502A-D, as described herein with reference to FIG. 3 and the row inputs of the input matrix 140AT. When the 500D receives input, i.e., the checksum generated from the outputs d13, d14, d15, and d16, a comparator circuit 505 compares the checksum in the register 500D with first checksum pushed from the checksum column 204, i.e., the checksum c9.

If the checksum c9 matches the contents of the register 500D, then the error check is successful. If the checksum c9 does not match the contents of the register 500D, then the output checksum circuit 125 raises an error. In response to an error being raised, the computation unit 100 can perform one or more of a variety of actions, as described herein with reference to FIG. 2. The output checksum circuit 125 can continue to calculate the checksums of each row in the data sub-matrix 140D with a corresponding checksum in the checksum column 204. For example, the comparator circuit 505 compares the sum d9+d10+d11+d12 with the checksum c8; the sum d5+d6+d7+d8 with the checksum c7; the sum d1+d2+d3+d4 with the checksum c6; and the sum c1+c2+c3+c4 with the checksum c5.

Comparator circuits implemented as part of the output checksum circuit 125 can compare the checksums directly, or compute the absolute value of the difference between the compared checksums. Then comparator circuits can determine whether the absolute value of the difference between the checksums is within a predetermined threshold or not. In some examples, the threshold can be programmatically defined, e.g., based on the use case having a higher or lower tolerance for error. In other examples, the threshold can be specified at design time of the computation unit 100. In some applications, e.g., in executing some machine learning models, absolute precision is not required, and some amount of error can be tolerated in calculated floating point values, e.g., tolerated within the predetermined threshold.

While the output checksum circuit 125 generates checksums for each row of the data sub-matrix 140D, the output checksum circuit 125 can also generate checksums for each column of the output matrix C, and compare each generated checksum with a respective checksum in the checksum row 202. The output checksum circuit 125 can include adder circuits 504A-E; demultiplexers 503A-E; registers 507A-E; registers 510A-E; and comparator circuits 515A-E. While the output checksum circuit 125 is shown as including demultiplexers, it is understood that the demultiplexers 503A-E can be substituted with any of a variety of different decision making circuitry, e.g., control signals to disable or enable certain parts of the output checksum circuit 125, or switches, that are configured to send input to one of multiple outputs, for example based on a control signal.

For example, in a first time step, output d13 is passed to the register 500A (for computing a checksum for the first row of the output matrix C, as described herein), as well as a demultiplexer 503A. Demultiplexers 503A-E are configured to send checksums of the checksum row 202 to a respective register 510A-E, while sending the remainder of a column in the output matrix C to a respective adder circuit 504A-E and register 507A-E.

In a second time step, d13 is pushed to the adder circuit 504A, which adds the output d13 to the contents of the register 507A, which is initially zero. Also during the second time step, the output d14 is pushed to the adder circuit 502A and also the demultiplexer 503B. The output checksum circuit 125 can continue to receive and process the output elements of the output matrix C until reaching the checksums of the checksum row 202. At the same time, the output checksum circuit 125 can receive a control signal, e.g., the control signal used for the horizontal checksum circuit 115, and based on the presence of the control signal, push the checksum values of the checksum row 202 to the corresponding register 510A-E.

When both the contents of the registers 510A have been loaded with a corresponding checksum, e.g., checksum c1 for register 510A; checksum c2 for register 510B; checksum c3 for register 510C; checksum c4 for register 510D; and checksum c5 for register 510E, then each comparator circuit compares the stored checksum with the checksums generated and stored in the registers 507A-E. For example, the comparator circuit 515A compares the sum d1+d5+d9+d13 with the checksum c1; the comparator circuit 515B compares the sum d2+d6+d10+d14 with the checksum c2; the comparator circuit 515C compares the sum d3+d7+d11+d15 with the checksum c3; the comparator circuit 515D compares the sum d4+d8+d12+d16 with the checksum c4; and the comparator circuit 515E compares the sum c6+c7+c8+c9 with the checksum c5.

In some examples, the output checksum circuit 125 can be configured to generate one or more measurements or indicators corresponding to the number and severity of different errors detected. For example, the output checksum circuit 125 can compute the absolute value of the difference between compared checksums, which can be sent in addition to a raised flag to a coupled external processor. The absolute value of the difference between the compared checksums can be a measure of the severity of errors detected by the output checksum circuit 125—for example, larger values can indicate more severe errors than smaller values.

As with the comparisons made by the comparator circuit 505, if any of the comparator circuits 515A-E identify any mismatches (or mismatches exceeding a predetermined threshold), then the output checksum circuit 125 can raise a flag indicating that an error has occurred during the matrix multiplication of input matrices A and B.

Figure 6:
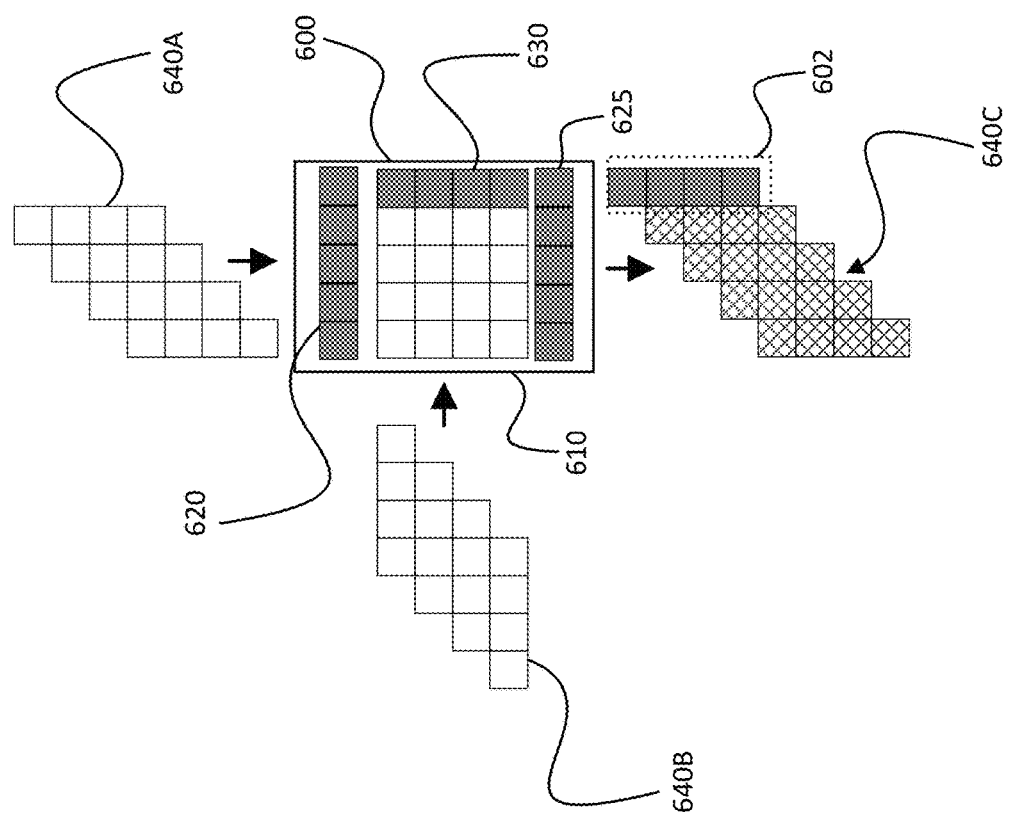
FIG. 6 is an example computation unit with a vertical checksum circuit and output checksum circuit, but no horizontal checksum circuit.

FIG. 6 is an example computation unit 600 with a vertical checksum circuit 620 and output checksum circuit 625, but no horizontal checksum circuit. Also shown in FIG. 6 are input matrices 640A, 640B; output matrix 640C with checksum column 602; and checksum processing elements 630. The output checksum circuit 625 can be configured to generate and compare checksums for each row of the output matrix C, with the checksums generated by the vertical checksum circuit.

Omitting the horizontal checksum circuit still allows for error detection, and further reduces complexity and input to the computation unit 600, at least because there is no requirement to manage, e.g. through a program executable by the computation unit 600, the timing of a control signal, as described herein with reference to the horizontal checksum circuit 115. In some cases, error detection, without the specific indication of where the error occurred—as afforded by the comparison of both a checksum row and a checksum column—can still be valuable where corrective actions taken do not require the precise location of the error. For example, the precise location of the error is not required if the default corrective action is to repeat the previous matrix multiplication or cold restart the computation unit.

In addition, omitting the horizontal checksum circuit allows for the logic for generating the checksums to be completely separated from the systolic array. Referring back to FIG. 4, checksums generated by the horizontal checksum circuit 115 were pushed to the systolic array 110, and therefore were required to follow the input specification of the systolic array 110, e.g., if the systolic array 110 was configured only to receive input up to a certain level of precision. As the computation unit 600 omits the horizontal checksum circuit as described in FIG. 4, the remaining checksums are stored in the checksum processing elements 630, which can be separate from the systolic array 610. In some examples, the checksums generated by the vertical checksum circuit 620 can have different measures of precision and/or be of a different type from the elements of the input matrices altogether.

The omission of the horizontal checksum circuit can allow for more flexibility among different types of linear operations for checksum generation which can be implemented. For example, floating point checksums can be used for 8-bit integer elements; 16-bit integers can be used for 8-bit integer elements; and Galois field arithmetic or modulo add or multiply operations can be used for checksum calculation generally.

In some implementations, the vertical checksum circuit 620 can be enhanced to generate multiple checksum columns, based on different linear operations for generating checksums from input elements of the rows of input matrix A. Given that for every linear code defined over a finite field, there exists a corresponding linear real-number code with similar error detecting and correcting capabilities, additional error detection processes can be applied, such as N check-symbol Reed-Solomon codes, if using Galois field arithmetic to generate the checksums. Otherwise, a corresponding real-number code can be used.

In some examples, if the input matrix A is streamed and the input matrix B is latched or preloaded into a systolic array, then the computation unit for the systolic array can instead implement an appropriately configured horizontal checksum circuit, i.e., coupled to checksum processing elements and configured to generate checksum columns as described herein with reference to FIG. 3; and an appropriately configured output checksum circuit, i.e., configured to compute and compare column checksums with the checksums generated by the horizontal checksum circuit. In other words, different implementations of the computation unit can have different orientations and positions of the checksum circuit relative to how the systolic array receives the input, without affecting the overall error detecting functionality as described herein.

A computation unit as described herein can be configured to operate using none, one, or both of a horizontal checksum circuit and vertical checksum circuit. The computation unit may use neither the horizontal checksum circuit nor the vertical checksum circuit, for example because error detection has been programmatically disabled. The same computation unit can also be configured to operate using only one of the horizontal and vertical checksum circuit to perform error detection, e.g., as described herein with reference to FIG. 6. The same computation unit can also be configured to operate using both the horizontal and the vertical checksum circuits to perform error detection, e.g., as described herein with reference to FIGS. 1-5.

Figure 7:
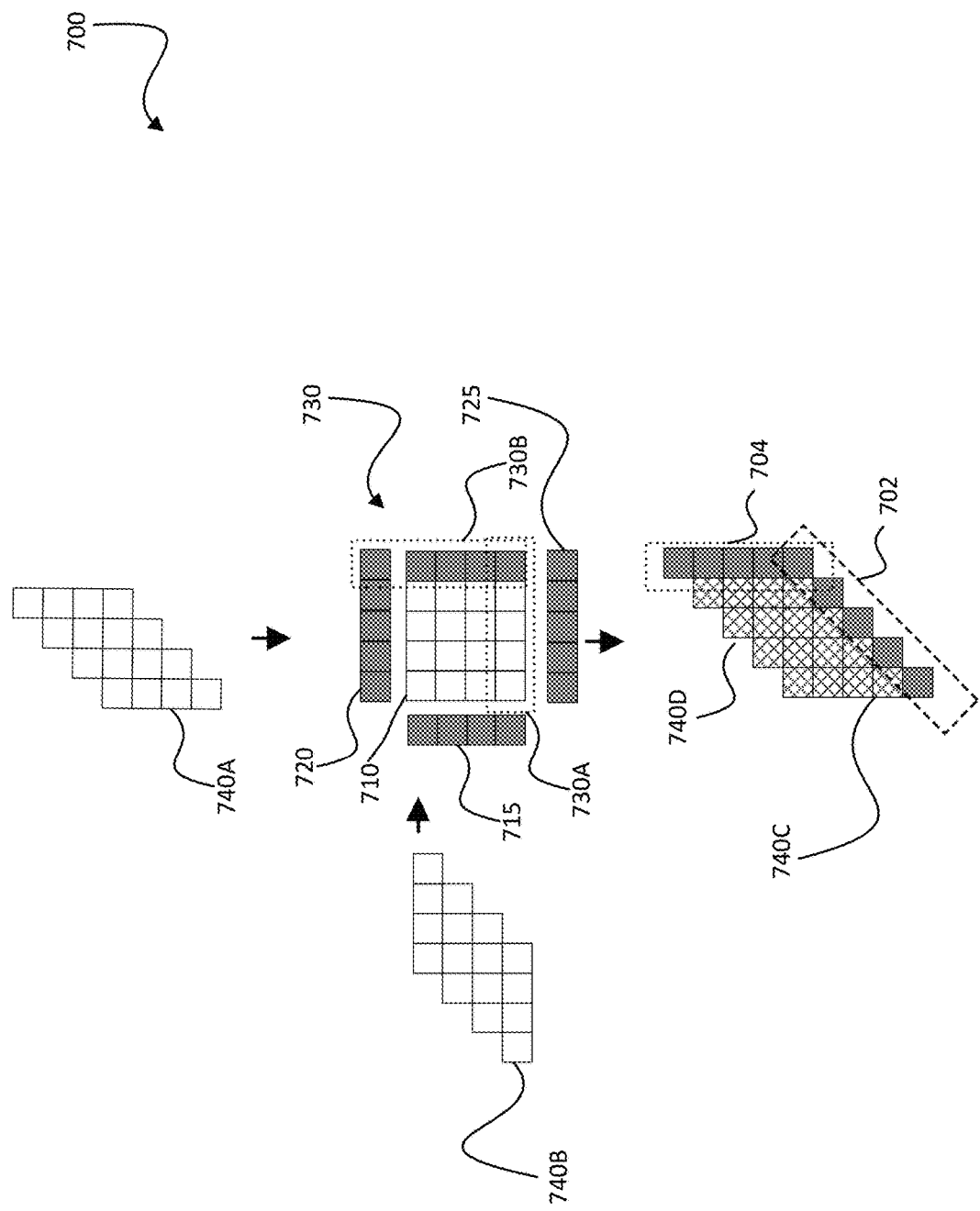
FIG. 7 is an example computation unit with an output stationary systolic array.

FIG. 7 is an example computation unit 700 with an output stationary systolic array 710. In an output stationary systolic array, each processing element keeps a respective output element of output matrix C 740C, and input matrices A, B, 740A, B can be streamed into the systolic array 710. When all of the input elements of matrices A and B are processed, the output matrix C is pushed through output checksum circuit 725. The computation unit 700 also includes vertical checksum circuit 720 and horizontal checksum 715. Both checksum circuits 715, 720 are coupled to checksum processing elements 730, which includes a row 730A of checksum processing elements, and a column 730B of checksum processing elements.

The vertical checksum circuit 720 is configured similar to the vertical checksum circuit 120, and is configured to generate checksums from the rows of the input matrix A 740A (which may be a transposed version of an original input matrix, as described herein with reference to the input matrix A and matrix $A^T$). The column 730B of checksum processing elements can correspond to the checksum processing elements 130, which is configured to receive and store generated checksums to be used for comparison later by the output checksum circuit 725.

The horizontal checksum circuit 715 can also be implemented similar to the vertical checksum circuit 120, but with a corresponding row 730A of checksum processing elements. Both the horizontal checksum circuit 715 and the row 730A are turned 90 degrees relative to their counterpart circuit 720 and column 730B of processing elements. However, the horizontal checksum circuit 715 can also be configured to generate checksums for corresponding columns of the input matrix B 740B (or corresponding rows, if the input matrix B 740B is transposed).

The output checksum circuit 725 can be configured to generate and compare checksums, as described previously with reference to the output checksum circuit 125 and FIG. 5. In this example arrangement of the horizontal and vertical checksum circuits, checksum row 702 is pushed out first, before values of data sub-matrix 740D of the output matrix 740C. The output checksum circuit 725 can be configured to push each first output element in a respective column of the output matrix 740C to a corresponding register of a comparator circuit, and proceed to accumulate the remaining column output elements in a respective register coupled to a respective adder circuit.

In some examples, instead of adding a separate partial sum to compare with the received checksum of the output matrix C 740C, the output checksum circuit 725 can be configured to receive a checksum from the checksum row, and subtract from the checksum each output element of the output matrix C 740C above the checksum. If, after subtracting all of the output elements, the result is not zero or close to zero within a predetermined threshold, the output checksum circuit 725 can send an indication that an error has been detected. Depending on the results of error detection by the comparison of the checksums in the row 704 of checksum processing elements (for example, by subtraction from output elements in corresponding rows, or by comparing each checksum with a corresponding accumulated checksum, as described here), the output checksum circuit 725 can also pinpoint where the error occurred, e.g., at the intersection of the column and row with the erroneous check sums.

In the configuration described with reference to FIG. 7, the computation unit 700 completely separates the data path of the systolic array, e.g., in receiving inputs and performing matrix multiplication, with the error checking logic implemented by the checksum circuits 715, 720, and 725. This can allow for an increased variety of different linear operations for ABFT for matrix multiplication, for example, without concerns about matching data type and precision (e.g., as described with reference to omitting the horizontal checksum circuit in the computation unit 600 of FIG. 6).

This is the reverse of the operation of the output checksum circuit 125 as described with reference to FIG. 5, where a control signal was used to indicate when the output checksum circuit 125 was receiving a checksum of the output matrix 140C. The output checksum circuit 725 in some examples can also use a control signal, for example when large input matrices 740A, B, are streamed into the systolic array 710. In those examples, the control signal can be sent to the output checksum circuit 125 at the beginning of each group of output elements for checksum generation and comparison, as opposed to the end.

Systolic arrays can operate according to different voltage levels. A critical supply voltage is a value indicating the voltage that is sufficient for correct operation of the systolic array, e.g., in the face of different environmental or process-related variabilities that can impact circuit performance. Voltage supplied to the systolic array at a level lower than the critical supply voltage can be more energy-efficient, e.g., because less energy is necessary to operate the systolic array, but runs the risk of errors, e.g. timing errors, in the face of the aforementioned variabilities. Timing errors can quickly cascade into more severe errors if not corrected or addressed, and particularly computation units using systolic arrays in which proper timing of input and output across processing elements is critical. A data processing system implementing a computation unit as described herein can supply a reduced voltage to the computation unit, and raise the voltage as necessary in response to receiving error detection flags from the computation unit. Because errors are relatively infrequent compared to normal operation of a computation unit with a systolic array, and particularly when multiple computation units are executed in parallel, the occasional error and corrective action can be generally outweighed by executing the systolic array at a supplied voltage below the critical supply voltage level.

The computation unit can detect errors related to low voltage according to the same mechanisms described herein with reference to FIGS. 1-6. Whereas other approaches require additional logic at multiple different latches, shadow latches, or flip/flop circuits, the horizontal, vertical, and output checksum circuits are independent of the systolic array, and do not require delaying the execution of matrix multiplication or other operations on the array. Further, the predetermined thresholds with which the comparator circuits of the output checksum circuits use to compare generated and received checksums can be tuned to tolerate smaller errors caused by the reduced voltage supplied to the systolic array.

Control logic, e.g., implemented by a data processing system implementing the computation unit, can also adjust the supplied voltage or frequency, e.g., clock frequency at which the data processing system operates, with regard to the observed rates at which error occurs, in order to further improve energy efficiency on the computation unit.

Timing errors can occur not only in the processing of the systolic array, but also in the execution of the error detection logic provided by the horizontal checksum circuit, the vertical checksum circuit, and/or the output checksum circuit Timing errors in these circuits can be addressed under a number of different approaches. In some examples, higher voltage can be supplied to one or more of the horizontal checksum circuit, the vertical checksum circuit, and the output checksum circuit. In other examples, specialized transistors or other components can be implemented in the vertical, horizontal, and/or output checksum circuits to improve the rate at which the error checking operations described herein are performed, e.g., generating checksums and comparing checksums.

Figure 8A:
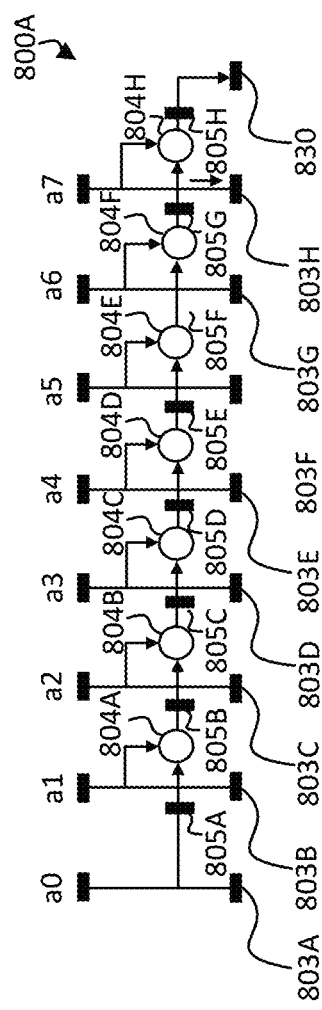
FIG. 8A is an example vertical checksum circuit. The vertical checksum circuit is configured to generate checksums from rows of an input matrix of length 8.
Figure 8B:
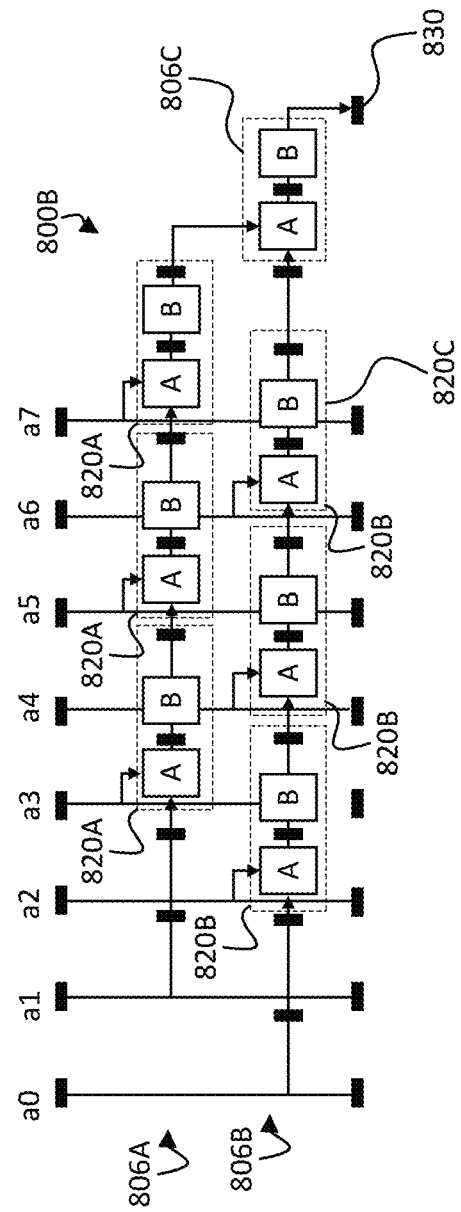
FIG. 8B is an example vertical checksum circuit having 2-input 2-stage pipelined adder circuits.
Figure 8C:
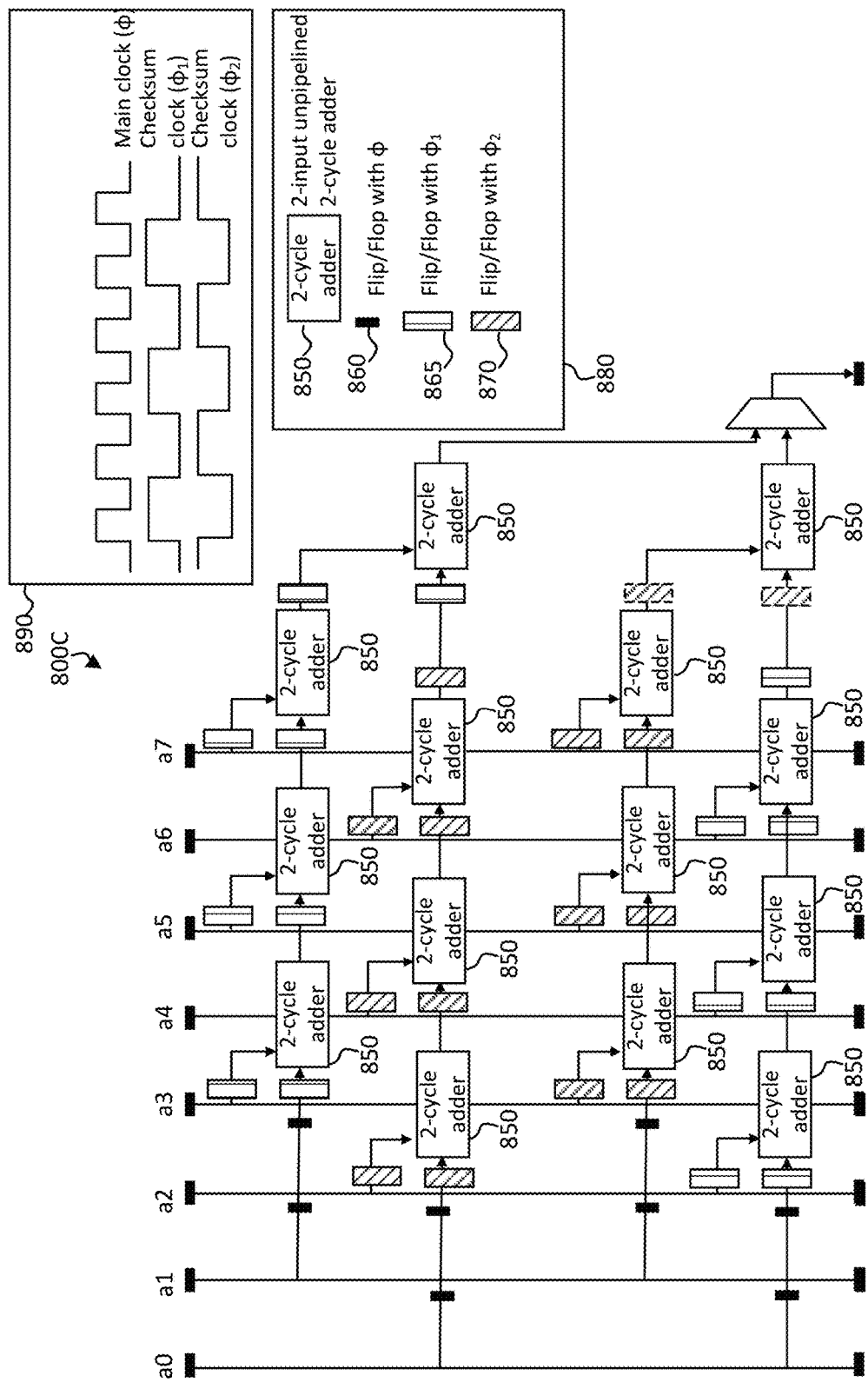
FIG. 8C is a circuit diagram for another example vertical checksum circuit with 2-cycle non-pipelined adder circuits.

In yet other examples, as described herein with reference to FIGS. 8A-C, the horizontal checksum circuit can be modified to allow for a wider margin in timing as different operations are performed from time step to time step. The increased margin can mitigate the chance of timing errors occurring in the error detection logic itself, and therefore reducing the chance of inaccurate error detection, or missing undetected errors, caused by operating the computation unit at a lower supplied voltage.

FIG. 8A is an example vertical checksum circuit 800A. The vertical checksum circuit 800A is configured to generate checksums from rows of an input matrix of length 8. The vertical checksum circuit 800A can receive inputs a0-a7, and include registers 805A-H and adder circuits 804A-H. The generated checksum stored in register 805H can be pushed to checksum processing element 830. Inputs a0-a7 are also pushed to processing elements 803A-H of a systolic array.

FIG. 8B is an example vertical checksum circuit 800B having 2-input 2-stage pipelined adder circuits. The circuit 800B is a modified version of the circuit 800A, with the replacement of the adder circuits 804A-H with 2-input 2-stage pipelined adder circuits 820A, B, and C ("adder circuits 820"). The circuit 800B can be configured to delay the generation of checksums. The adder circuits 820A, B, C have a latency of two time steps, e.g., two clock cycles, and a throughput of one summation or addition operation performed, per clock cycle. Each adder circuit 820 can include a 2-to-1 adder circuit, including intermediate adder circuits A and B, and a register between the two intermediate adder circuits to store an intermediate sum.

The vertical checksum circuit 800B splits the processing of the input elements a0-a7 across two pipeline stages 806A and 806B. Odd-numbered input elements (e.g., a1, a3, a5, and a7) are accumulated across the adder circuits 820A in stage 806A, while even-numbered input elements (e.g., a0, a2, a4, and a6) are accumulated across the adder circuits 820B in stage 806B. The partial sums generated through stages 806A, B are added together in adder circuit 806C, and the results are passed to the checksum processing element 830.

The additional latency provided by the adder circuits 820 increases the timing margin for correct operation of the vertical checksum circuit 800B, reducing the chance or miscalculations as a result of timing errors caused by operating with a lower level of supplied voltage, even when the vertical checksum circuit 800B is operating at below the critical voltage level. Compared with a vertical checksum circuit 800A, the vertical checksum circuit 800B requires three additional clock cycles to generate a checksum, but the additional latency in the vertical checksum circuit 800B does not affect throughput of the input elements a0-a7 into a systolic array connected to the vertical checksum circuit 800B, and does not affect processing latency, e.g., does not increasing the number of clock cycles, for the systolic array to process input matrices.

In other examples of the vertical checksum circuit 800B, the vertical checksum circuit 800B can include different numbers of stages, and/or different numbers of adder circuits or other processing circuits configured to generate checksums according to a specified linear operation, over different numbers of clock cycles.

FIG. 8C is a circuit diagram for another example vertical checksum circuit 800C with 2-cycle non-pipelined adder circuits 850. The vertical checksum circuit 800C includes a number of 2-cycle adder circuits 850, as well as flip/flop circuits 860, 865, and 870. The 2-cycle adder circuits are configured to receive two inputs, and generate a sum of those two inputs over two clock cycles. As indicated by legend 880, flip/flop circuits 860 are colored-in solid, flip/flop circuits 865 have vertical thatch marks, and flip/flop circuits 870 have diagonal thatch marks, in the circuit diagram for the vertical checksum circuit 800C. It is understood that in some examples, other types of circuits configured to store data can be used in place of the flip/flop circuits 860, 865, 870. The flip/flop circuits 860, 865, and 870 operate at different clock frequencies.

The flip/flop circuits 860 operate at a clock frequency $\phi_0$. The clock frequency can be set by a timing circuit connected to the computation unit implementing the vertical checksum circuit 800C, as described herein with reference to FIGS. 10 and 11. The flip/flop circuits 865 and 870 can operate at different respective clock frequencies $\phi_1$ and $\phi_2$. The clock frequencies $\phi_1$ and $\phi_2$ can have different phases, as indicated by chart 890. The vertical checksum circuit 800C also has an increased timing margin relative to the circuit 800A, to mitigate the chance of timing errors affecting the error checking functionality of the computation unit implementing the vertical checksum circuit 800C, as described herein with reference to the vertical checksum circuit 800B.

In other examples of the vertical checksum circuit 800C, the vertical checksum circuit 800B can include different flip/flop circuits operating at different frequencies, and/or different numbers of adder circuits or other processing circuits configured to generate checksums according to a specified linear operation, over different numbers of clock cycles.

Figure 9A:
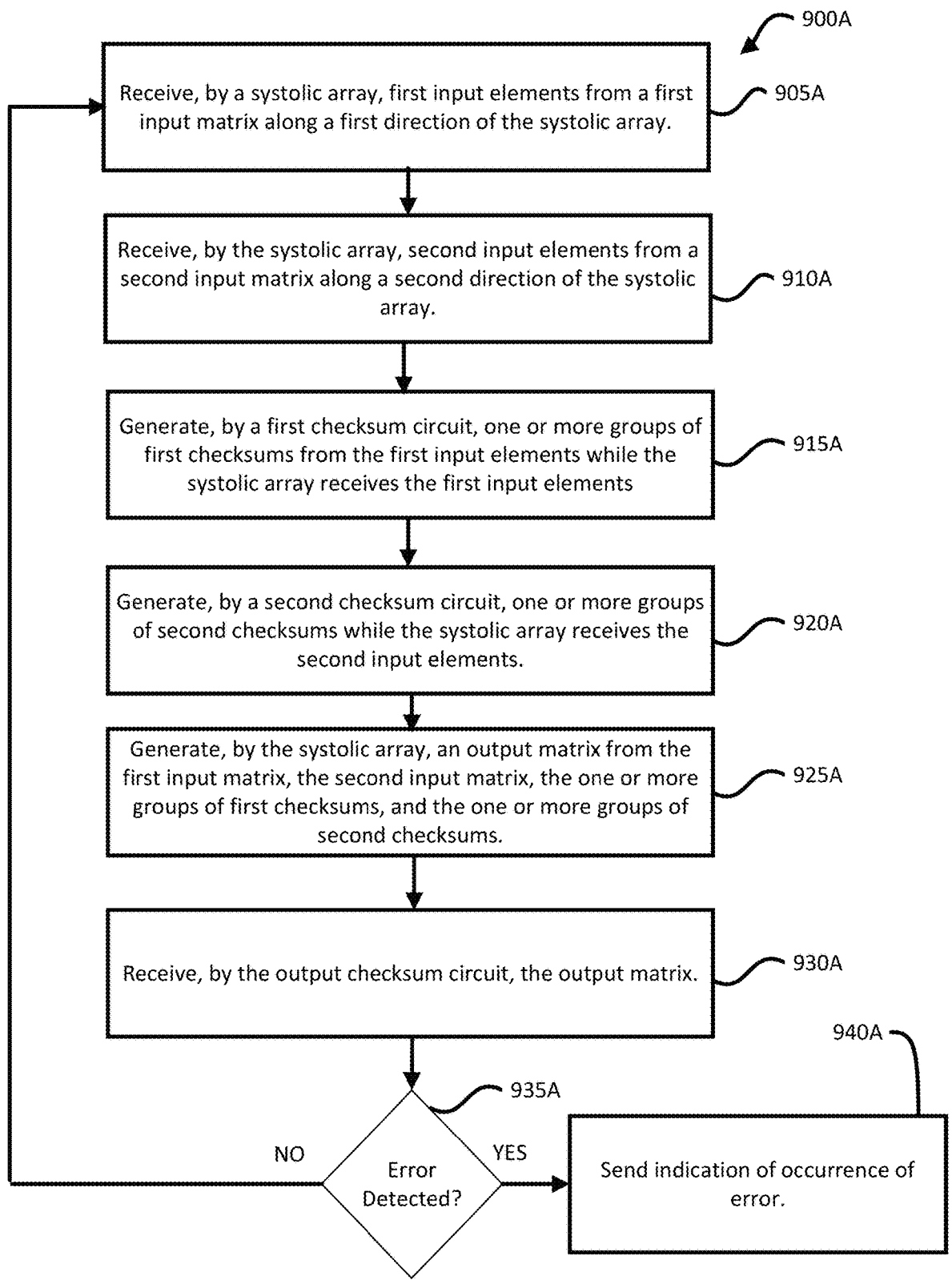
FIG. 9A is a flow chart of an example process for performing matrix multiplication with error detection on a computation unit, according to aspects of the disclosure.

FIG. 9A is a flow chart of an example process for performing matrix multiplication with error detection on a computation unit, according to aspects of the disclosure.

A systolic array of a computation unit receives first input elements from a first input matrix along a first direction of the systolic array, according to block 905A. For example, the first input elements can be input elements of an input matrix A, received from the top periphery of the systolic array, for example as described herein with reference FIG. 3. It is understood that the systolic array can be configured to receive input from any direction, with corresponding checksum circuit implemented consistent with aspects of the disclosure.

The systolic array receives second input elements from a second input matrix along a second direction of the systolic array, according to block 910A. The second direction can be a horizontal direction, e.g., left-to-right, while the first direction can be a vertical direction, e.g., top-to-bottom, relative to a fixed orientation of the systolic array. The second input elements can be input elements from an input matrix B, for example as described herein with reference to FIG. 4.

A first checksum circuit of the computation unit generates one or more groups of first checksums from the first input elements while the systolic array receives the first input elements, according to block 915A. The first checksum circuit can be the vertical checksum circuit, e.g., the vertical checksum circuit 120 of FIG. 2. The one or more groups of first checksums can be columns of checksums generated and later stored in checksum processing elements, e.g., checksum processing elements 130 of FIG. In some examples, the one or more groups of checksums can refer to multiple columns or rows of checksums generated according to different linear operations. In some examples, the computation unit includes one or more checksum processing elements configured to receive checksums from one or both of the first and second checksum circuits.

A second checksum circuit of the computation unit generates one or more groups of second checksums from the second input elements while the systolic array receives the second input elements, according to block 920A. The second checksum circuit can be a horizontal checksum circuit, e.g., the horizontal checksum circuit 115 of FIG. 1. The second checksum circuit can generate checksums, for example as described herein with reference to the horizontal checksum circuit 115 and FIG. 4. In some examples, if the input matrix to the second checksum circuit is streamed into the systolic array, the second checksum circuit can push a control signal across the circuit to indicate when checksums can be pushed into the systolic array, and new checksums can be generated. The timing of the control signal to one or both of the first and second checksum circuits can be based on the number of time steps to load first or second input values across the systolic array. A time step can be one or more clock cycles.

In some examples, the systolic array is an output stationary systolic array, and both the first and the second checksum circuits are connected to a plurality of checksum processing elements, the checksum processing elements configured to receive generated checksums from one or both of the first and second checksum circuits. The plurality of checksum processing elements can be located on the periphery of the systolic array, e.g., as described herein with reference to FIG. 7.

The systolic array generates an output matrix from the first input matrix, the second input matrix, the one or more groups of first checksums, and the one or more groups of second checksums, according to block 925A. The output matrix can be the output matrix C, for example as described herein with reference to FIG. 2.

An output checksum circuit receives the output matrix, according to block 930A. As described herein with reference to FIG. 5, the output checksum circuit can receive the output matrix as the output matrix is pushed out of the systolic array. In some examples, the computation unit generates checksums only from the first checksum unit, or generates checksums only from the second checksum unit.

The output checksum circuit determines whether an error is detected in the computation of the output matrix, according to diamond 935A. If an error is detected ("YES"), then the output checksum circuit sends an indication of occurrence of an error (or more than error, if applicable), according to block 940A. Otherwise ("NO"), the process 900A can continue with new input elements for processing and performing error detection.

Until receiving a response to the indication of error detection, the systolic array can receive a first voltage less than the critical voltage, which can be predetermined as described herein with reference to FIGS. 8A-C and the preceding description. In response to sending the indication or identifying one or more errors, the systolic array can begin to receive a second voltage higher than the critical voltage. The systolic array can automatically receive the second voltage, or the second voltage can be applied to the systolic array by another device. In some examples, the systolic array automatically reverts to receiving the first voltage, e.g., after a period of time has passed without detecting any errors.

One or more of the first, second, and output checksum circuits can continue to receive voltage lower than the critical voltage of the systolic array. The first, second, and output checksum circuits can be implemented in accordance with aspects of the disclosure to increase the timing margin of the operation of the circuits, so as to mitigate timing errors resulting from the reduced voltage. For example, one or both of the first and second checksum circuits can include 2-input 2-stage pipelined adder circuits, as described herein with reference to FIG. 800B. As another example, one or both of the first and second checksum circuits can include one or more 2-cycle adder circuits, and a plurality of registers, which may each include one or more flip/flop circuits, operating at different clock frequencies. For example, some registers may operate at a first frequency, some at a second frequency, and others at a third frequency. The second and third frequencies can be half of the first frequency, with different phases.

Figure 9B:
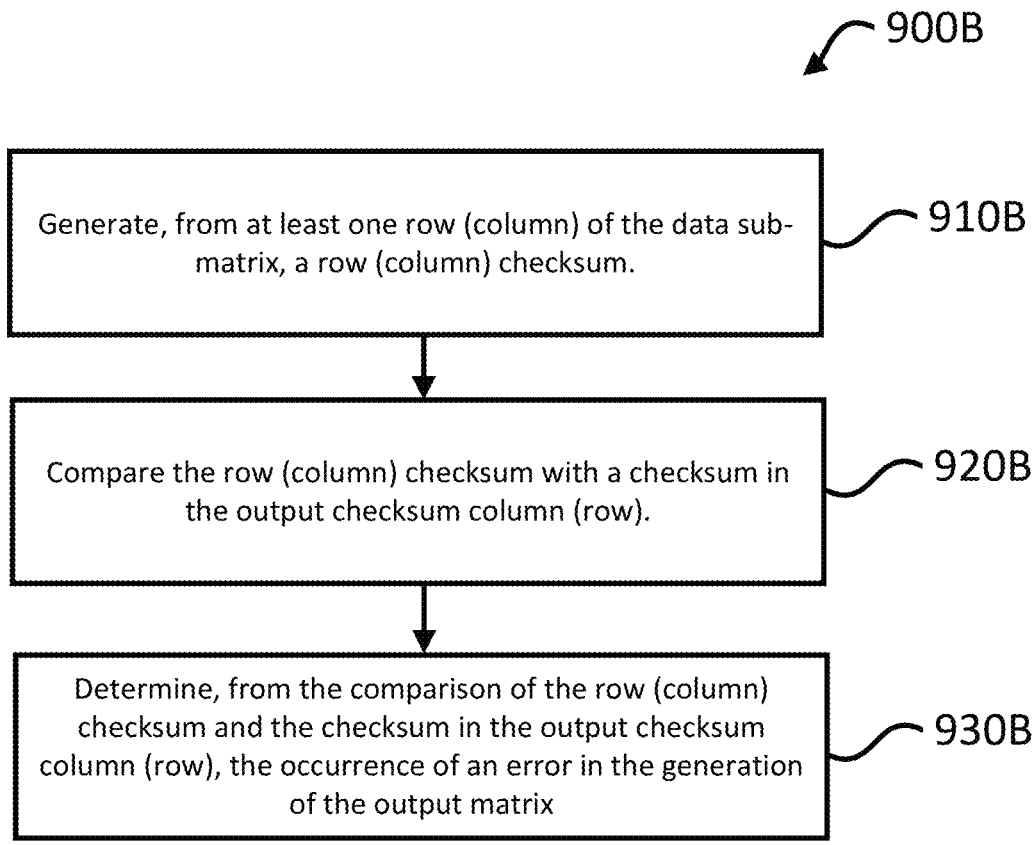
FIG. 9B is a flow chart of an example process for detecting the occurrence of errors during processing of a computation unit, according to aspects of the disclosure.

FIG. 9B is a flow chart of an example process 900B for detecting the occurrence of errors during processing of a computation unit, according to aspects of the disclosure. For example, the process 900B can be performed as part of the determination as to whether errors have been detected, according to diamond 935A of FIG. 9A.

The output checksum circuit generates, from at least one row of a data sub-matrix, a column checksum, according to block 910B. The data sub-matrix can be the output from processing both input matrices, without their corresponding checksums, e.g., the data sub-matrix 140D as described with reference to FIG. 2. For example, the output checksum circuit can accumulate output elements in a received row of the output matrix, and store the checksum in a register, e.g., the register 500D as described herein and shown in FIG. 5. Also according to block 910B, the output checksum circuit generates, from at least one column of the data sub-matrix, a column checksum. The column checksums can be generated independent of the row checksums, and can be generated in parallel for each column of the output matrix. For example, the output checksum circuit can generate the column checksums and store them in respective registers of the circuit, such as registers 510A-E as described and shown with reference to FIG. 5. In some examples, both column and row checksums are generated by the output checksum circuit. In other examples, only column checksums and only row checksums are generated.

The output checksum circuit compares the row checksum with a checksum in an output checksum column of the output matrix, according to block 920B. The output checksum column can correspond to the checksum column 204, for example. The comparison by the output checksum circuit can be performed by one or more comparator circuits, e.g., the comparator circuit 505 as described and shown with reference to FIG. 5. Also according to block-920B, the output checksum circuit compares the column checksum with a checksum in the output checksum row of the output matrix. The output checksum row can be, for example, the checksum row 202 of the output matrix C as shown in FIG. 2. One or more output checksum rows can be checked in parallel by the output checksum circuit, e.g., using comparator circuits 515A-E as described and shown in FIG. 5.

The comparisons between row/column checksums with checksums in output checksum columns/rows can be done in parallel or in sequence, as examples. In some examples, only comparisons using row checksums are performed with checksums in output checksum columns, and vice versa with column checksums and output checksum rows.

The output checksum circuit determines, from the comparison of the row checksum and the checksum in the output checksum column, the occurrence of an error in the generation of the output matrix, according to block 930B. The output checksum circuit can determine, for example, whether the compared checksums match, or if they match within a predetermined threshold. If not, then the output checksum circuit can send an indication that an error has occurred, e.g., as described herein with reference to block 940A and FIG. 9A. Also according to block 930B, the output checksum circuit determines, from the comparison of the column checksum and the checksum in the output checksum row, the occurrence of an error in the generation of the output matrix.

The determinations from the comparisons of the row/column checksums and a corresponding checksum in an output checksum column/row can occur simultaneously, in parallel, or in sequence, as examples. In some examples, the output checksum circuit can send an indication after one error is detected, or after a threshold number of errors is directed. In some examples, the indication can include a measure of the severity of the error, e.g., the absolute difference between the compared checksums. In other examples, the indication can include information relating to the origin of the error, e.g., the intersection of errors detected for a checksum in a checksum row and a checksum for a checksum column.

Figure 10A:
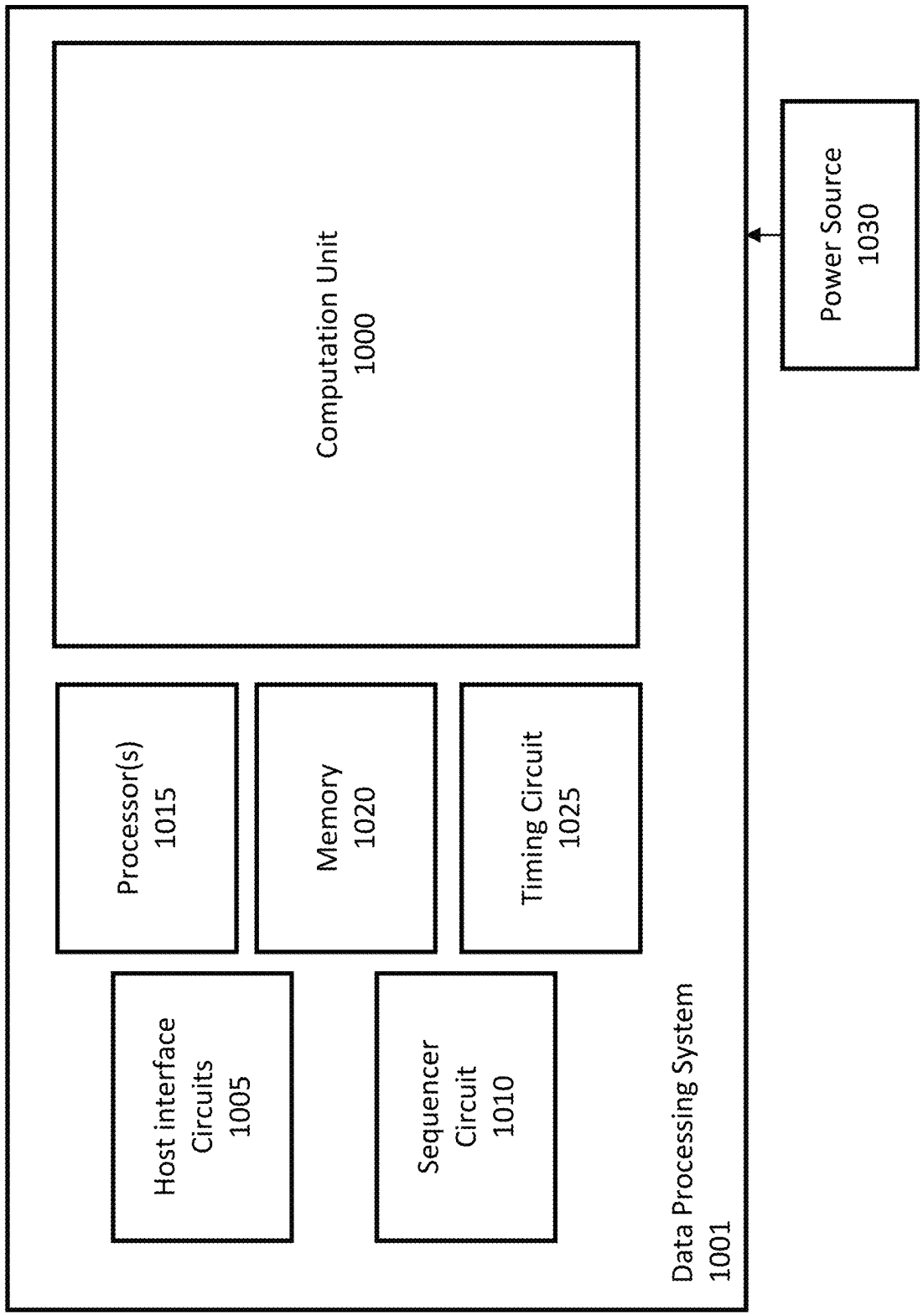
FIG. 10A is a block diagram of a data processing system implementing an example computation unit.

FIG. 10A is a block diagram of a data processing system 1001 implementing an example computation unit 1000. The computation unit 1000 can be any of a variety of different computation units, for example the computation unit 100 described herein with reference to FIGS. 1-5. The computation unit 1000 can implement any of a variety of combinations of the horizontal, vertical, and output checksum circuits as described throughout this specification.

The data processing system can include a host interface 1005, a sequencer circuit 1010, one or more processor(s) 1015, memory 1020, and a timing circuit 1025. The data processing system 1001 can be implemented in one or more devices across one or more physical locations, as described herein with reference to FIG. 11. In some examples, the components of the data processing system 1001 described can be implemented on one or more chips, which can interface with a host device according to any of a variety of data bus or other physical interconnect interfaces. In some examples, the data processing system 1001 can be implemented on one or more devices on a network, e.g., on one or more servers of a cloud platform.

Figure 11:
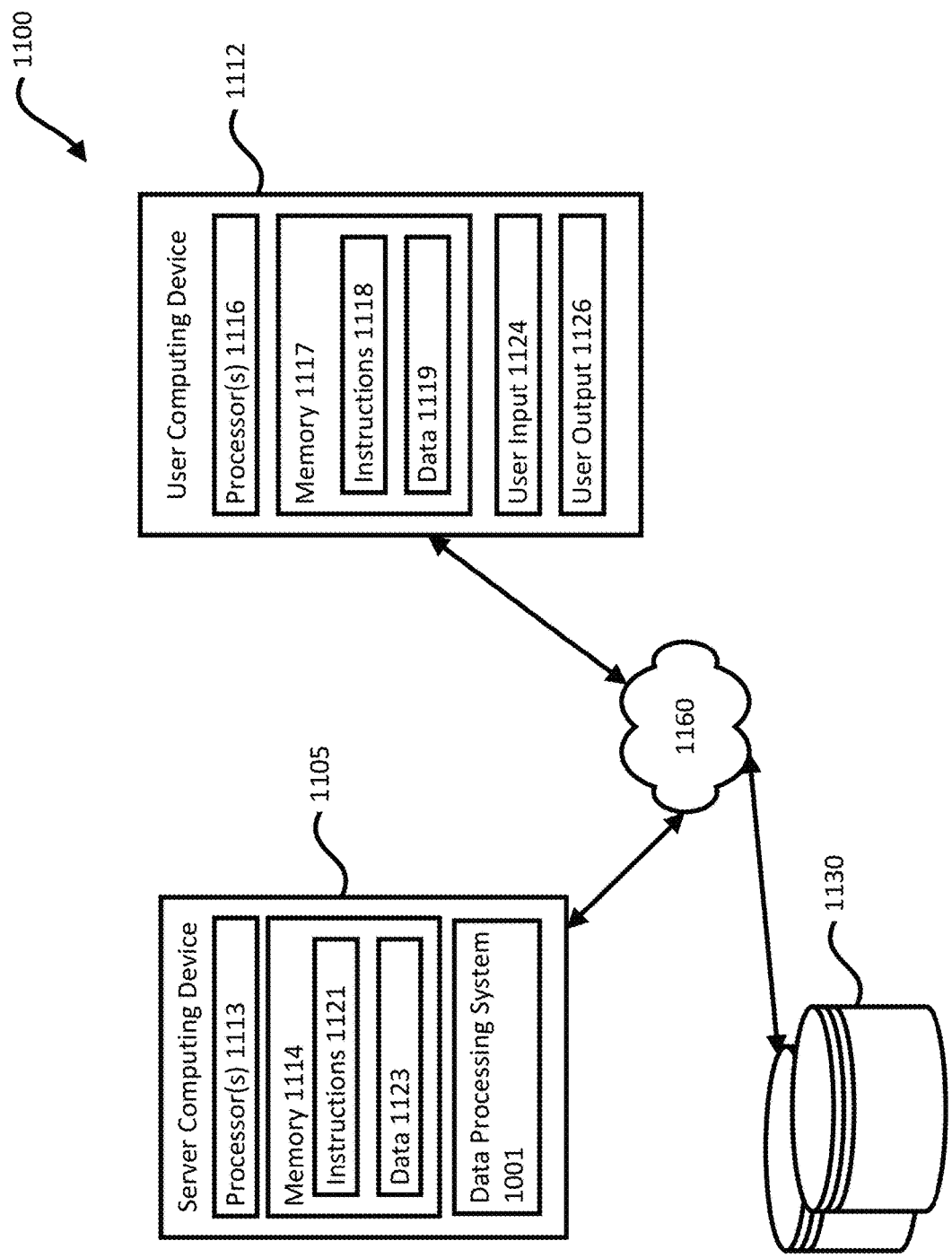
FIG. 11 is a block diagram of an example environment for implementing the data processing system including the computation unit 1000.

The processor(s) 1015 and memory 1020 can be any of a variety of different types of processors and memory as described herein with reference to FIG. 11. In some examples, the processor(s) 1015 receive instructions that are executable by the computation unit 1000 for processing data. For example, the instructions can be part of a computer program written for performing operations using the computation unit 1000.

The sequencer circuit 1010 can convert the received instructions into one or more signals understood by the computation unit 100, which causes the computation unit 1000 to perform any of a variety of preconfigured operations. These operations can include loading data, e.g., from the memory 1020, into the systolic array of the computation unit 1000 (not shown), moving data into one or more of the processing elements of the systolic array, processing the data by the one or more processing elements, and pushing the data out of the systolic array. The sequencer circuit 1010 can also be configured to generate one or more control signals for controlling when checksums are pushed to the computation unit 1000, e.g., as described herein with reference to the horizontal checksum circuit 115 and FIG. 4.

The host interface 1005 can be configured to receive data from outside the data processing system, e.g., from a processor or another device, and send data generated by the computation unit 1000, e.g., the product of a matrix multiplication, to the one or more devices or processors.

The timing circuit 1025 can be configured to control the timing of the computation unit, e.g., its clock frequency or clock rate. The time steps described herein with reference to the operations of the checksum circuits can be measured in terms of clock cycles managed by the timing circuit 1025.

The data processing system 1001 can also be connected to a power source 1030. The power source 1030 can be a battery or other form of power available on a host device implementing the data processing system, or can be a source external to the host device and connected to the host device and the data processing system 1001 through some wireless or physical connection, e.g., through wires. The power source 1030 can supply voltage to the computation unit 1000, which can be managed, e.g., adjusted higher or lower, by the processor(s) 1015.

Figure 10B:
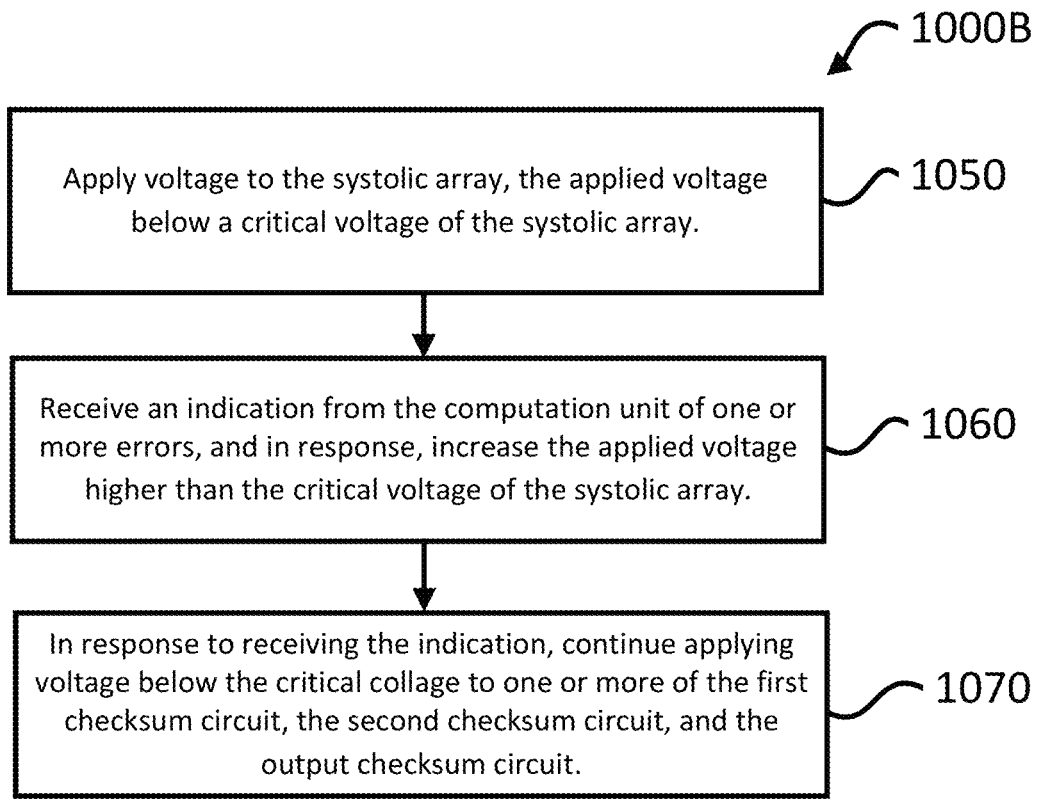
FIG. 10B is a flow chart of an example process for adjusting supplied voltage to a computation unit, in accordance with aspects of the disclosure.

FIG. 10B is a flow chart of an example process for adjusting supplied voltage to a computation unit, in accordance with aspects of the disclosure.

A data processing system implementing a computation unit can apply voltage to a systolic array of the computation unit, according to block 1050. The supplied voltage can be less than the critical voltage of the systolic array, which can be predetermined based on the use case operation of the computation unit, environmental factors, and/or architectural features of the systolic array, etc.

The data processing system receives an indication from the computation unit of one or more errors, and in response, increases the applied voltage higher than the critical voltage of the systolic array, according to block 1060. The computation unit can send indications of detected errors, for example, as part of performing the processes 900A-B as described in FIGS. 9A-B. The data processing system can increase the voltage supplied to the systolic array to reduce the risk of further errors occurring as a result of timing violations.

The data processing system, in response to receiving the indication, can continue applying voltage below the critical voltage of the systolic array, to one or more of a first checksum circuit, a second checksum circuit, and an output checksum circuit of the computation unit, according to block 1070. As described above, the horizontal, vertical, and output checksum circuits can be configured according to one or more of a variety of different approaches for increasing the timing margins of the operations performed by the circuits, e.g., generation of checksums, storage of checksums, comparison of checksums, so as to reduce the risk of timing errors.

In some examples, the data processing system can reduce the voltage to the systolic array after a period of time or condition has been met, e.g., after a period of time has passed without receiving additional indications of errors from the computation unit. In some examples, the data processing system can perform any of a variety of actions in response to receiving an indication of an error, such as rolling back operations performed by the computation unit back to a previous checkpoint, causing the computation to re-execute one or more operations, etc.

FIG. 11 is a block diagram of an example environment 1100 for implementing the data processing system 1001 including the computation unit 1000. The system 1001 can be implemented on one or more devices having one or more processors in one or more locations, such as in server computing device 1105. User computing device 1112 and the server computing device 1105 can be communicatively coupled to one or more storage devices 1130 over a network 1160. The storage device(s) 1130 can be a combination of volatile and non-volatile memory, and can be at the same or different physical locations than the computing devices 1112, 1105. For example, the storage device(s) 1130 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 1105 can include one or more processors 1113 and memory 1114. The memory 1114 can store information accessible by the processor(s) 1113, including instructions 1121 that can be executed by the processor(s) 1113. The memory 1114 can also include data 1123 that can be retrieved, manipulated or stored by the processor(s) 1113. The memory 1114 can be a type of non-transitory computer readable medium capable of storing information accessible by the processor(s) 1113, such as volatile and non-volatile memory. The processor(s) 1113 can include one or more central processing units (CPUs), graphic processing units (GPUs), field-programmable gate arrays (FPGAs), and/or application-specific integrated circuits (ASICs), such as tensor processing units (TPUs).

The instructions 1121 can include one or more instructions that when executed by the processor(s) 1113, causes the one or more processors to perform actions defined by the instructions. The instructions 1121 can be stored in object code format for direct processing by the processor(s) 1113, or in other formats including interpretable scripts or collections of independent source code modules that are interpreted on demand or compiled in advance. The instructions 1121 can include instructions for implementing the system 100 consistent with aspects of this disclosure. The system 100 can be executed using the processor(s) 1113, and/or using other processors remotely located from the server computing device 1105.

The data 1123 can be retrieved, stored, or modified by the processor(s) 1113 in accordance with the instructions 1121. The data 1123 can be stored in computer registers, in a relational or non-relational database as a table having a plurality of different fields and records, or as JSON, YAML, proto, or XML documents. The data 1123 can also be formatted in a computer-readable format such as, but not limited to, binary values, ASCII or Unicode. Moreover, the data 1123 can include information sufficient to identify relevant information, such as numbers, descriptive text, proprietary codes, pointers, references to data stored in other memories, including other network locations, or information that is used by a function to calculate relevant data.

The user computing device 1112 can also be configured similar to the server computing device 1105, with one or more processors 1116, memory 1117, instructions 1118, and data 1119. The user computing device 1112 can also include a user output 1126, and a user input 1124. The user input 1124 can include any appropriate mechanism or technique for receiving input from a user, such as keyboard, mouse, mechanical actuators, soft actuators, touchscreens, microphones, and sensors.

The server computing device 1105 can be configured to transmit data to the user computing device 1112, and the user computing device 1112 can be configured to display at least a portion of the received data on a display implemented as part of the user output 1126. The user output 1126 can also be used for displaying an interface between the user computing device 1112 and the server computing device 1105. The user output 1126 can alternatively or additionally include one or more speakers, transducers or other audio outputs, a haptic interface or other tactile feedback that provides non-visual and non-audible information to the platform user of the user computing device 1112.

Although FIG. 11 illustrates the processors 1113, 1116 and the memories 1114, 1117 as being within the computing devices 1105, 1112, components described in this specification, including the processors 1113, 1116 and the memories 1114, 1117 can include multiple processors and memories that can operate in different physical locations and not within the same computing device. For example, some of the instructions 1121, 1118 and the data 1123, 1119 can be stored on a removable SD card and others within a read-only computer chip. Some or all of the instructions and data can be stored in a location physically remote from, yet still accessible by, the processors 1113, 1116. Similarly, the processors 1113, 1116 can include a collection of processors that can perform concurrent and/or sequential operation. The computing devices 1105, 1112 can each include one or more internal clocks providing timing information, which can be used for time measurement for operations and programs run by the computing devices 1105, 1112.

The server computing device 1105 can be configured to receive requests to process data from the user computing device 1112. For example, the environment 1100 can be part of a computing platform configured to provide a variety of services to users, through various user interfaces and/or APIs exposing the platform services. One or more services can be a machine learning framework or a set of tools for generating neural networks or other machine learning models according to a specified task and training data. The user computing device 1112 may receive and transmit data specifying operations to be performed by the computation unit 1000.

The devices 1112, 1105 can be capable of direct and indirect communication over the network 1160. The devices 1105, 1112 can set up listening sockets that may accept an initiating connection for sending and receiving information. The network 1160 itself can include various configurations and protocols including the Internet, World Wide Web, intranets, virtual private networks, wide area networks, local networks, and private networks using communication protocols proprietary to one or more companies. The network 1160 can support a variety of short- and long-range connections. The short- and long-range connections may be made over different bandwidths, such as 2.402 GHz to 2.480 GHz (commonly associated with the Bluetooth® standard), 2.4 GHz and 11 GHz (commonly associated with the Wi-Fi® communication protocol); or with a variety of communication standards, such as the LTE® standard for wireless broadband communication. The network 1160, in addition or alternatively, can also support wired connections between the devices 1112, 1105, including over various types of Ethernet connection.

Although a single server computing device 1105, user computing device 1112, data processing system 1001 are shown in FIG. 11, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof. In some examples, one or more devices implement one or more data processing systems, each data processing system including one or more computation units according to aspects of the disclosure. In some examples, a single device can implement multiple computation units, each of the multiple computation units configured to communicate with at least one other computation unit for performing a distributed data processing task, e.g., in sequential or parallel processing.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system, or be part of multiple systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A computation unit comprising:
 a two-dimensional systolic array of processing elements, the systolic array configured to receive first input elements from a first input matrix along a first direction of the systolic array, and receive second input elements from a second input matrix along a second direction of the systolic array;
 a first checksum circuit configured to generate one or more groups of first checksums from the first input elements while the systolic array receives the first input elements;
 a second checksum circuit configured to generate one or more groups of second checksums while the systolic array receives the second input elements;
 the systolic array further configured to generate an output matrix from the first input matrix, the second input matrix, the one or more groups of first checksums, and the one or more groups of second checksums; and
 an output checksum circuit configured to receive the output matrix, and determine, from the output matrix, the occurrence of one or more errors in the generation of the output matrix.

2. The computation unit of claim 1,
 wherein the output matrix comprises a data sub-matrix comprising values generated by the systolic array using the first input elements and the second input elements, an output checksum row, and a output checksum column; and
 wherein to determine the occurrence of one or more errors in the generation of the output matrix, the output checksum circuit is configured to:
  generate, from at least one row of the data sub-matrix, a row checksum;
  compare the row checksum with a checksum in the output checksum column; and
  determine, from the comparison of the row checksum and the checksum in the output checksum column, the occurrence of an error in the generation of the output matrix.

3. The computation unit of claim 2, wherein to determine the occurrence of one or more errors in the generation of the output matrix, the output checksum circuit is further configured to:
 generate, from at least one column of the data sub-matrix, a column checksum;
 compare the column checksum with a checksum in the output checksum row; and
 determine, from the comparison of the column checksum and the checksum in the output checksum row, the occurrence of an error in the generation of the output matrix.

4. The computation unit of claim 3, wherein to determine the occurrence of one or more errors in the generation of the output matrix, the output checksum circuit is further configured to:
 generate, from at least one row of the data sub-matrix, a row checksum;
 compare the row checksum with a checksum in the output checksum column; and
 determine, from the comparison of the row checksum and the checksum in the output checksum column, the occurrence of an error in the generation of the output matrix.

5. The computation unit of claim 2, wherein to compare the row checksum with the checksum in the output checksum column, the output checksum circuit is further configured to determine whether the absolute difference between the row checksum and the checksum in the output checksum column are within a predetermined threshold.

6. The computation unit of claim 1, wherein the computation unit further comprises one or more checksum processing elements configured to receive checksums from one or both of the first and second checksum circuits.

7. The computation unit of claim 1, wherein one or both of the first and second checksum circuits are configured to send first or second checksums to the systolic array for processing, based on a control signal.

8. The computation unit of claim 7, wherein the timing of the control signal to the one or both of the first and second checksum circuits is based on the number of time steps to load first or second input values across the systolic array.

9. The computation unit of claim 1, wherein the computation unit is further configured to send, in response to the determination of the occurrence of one or more errors in the generation of the output matrix, an indication of the occurrence of one or more errors to one or more devices connected to the computation unit.

10. The computation unit of claim 9, wherein the systolic array is further configured to receive:
 after the indication of the occurrence of one or more errors is sent, receive, from the one or more devices, an adjusted voltage, the adjusted voltage higher than a critical voltage for the computation unit.

11. The computation unit of claim 10, wherein the systolic array is further configured to receive a first voltage lower than the critical voltage for the computation unit, until receiving the adjusted voltage in response to sending the indication.

12. The computation unit of claim 11, wherein one or both of the first and second checksum circuits are configured to receive a second voltage higher than the critical voltage.

13. The computation unit of claim 10, wherein one or both of the first and second checksum circuits comprise 2-input 2-stage pipelined adder circuits configured to delay the generation of one or both of the first and second checksums.

14. The computation unit of claim 10, wherein one or both of the first and second checksum circuits comprise:
 one or more 2-cycle adder circuits and,
 a plurality of registers, the plurality of registers comprising one or more first registers configured to receive and send data according to a first clock frequency, one or more second registers configured to receive and send data according to a second clock frequency, and one or more third registers configured to receive and send data according to a third clock frequency, wherein the first, second, and third clock frequency are all different frequencies.

15. The computation unit of claim 1, wherein the systolic array is an output stationary systolic array, and wherein both the first and the second checksum circuits are connected to a plurality of checksum processing elements, the checksum processing elements configured to receive generated checksums from one or both of the first and second checksum circuits.

16. A data processing system,
the data processing system comprising one or more processors, one or more memory devices, and a computation unit comprising:
a two-dimensional systolic array of processing elements, the systolic array configured to receive first input elements from a first input matrix along a first direction of the systolic array, and receive second input elements from a second input matrix along a second direction of the systolic array;
a first checksum circuit configured to generate one or more groups of first checksums from the first input elements while the systolic array receives the first input elements;
a second checksum circuit configured to generate one or more groups of second checksums while the systolic array receives the second input elements;
the systolic array further configured to generate an output matrix from the first input matrix, the second input matrix, the one or more groups of first checksums, and the one or more groups of second checksums; and
an output checksum circuit configured to receive the output matrix, and determine, from the output matrix, the occurrence of one or more errors in the generation of the output matrix.

17. The data processing system of claim 16, wherein the data processing system is configured to:
apply voltage to the systolic array, the applied voltage below a critical voltage of the systolic array; and
receive an indication from the computation unit of one or more errors, and in response, increase the applied voltage higher than the critical voltage of the systolic array.

18. The data processing system of claim 17, wherein the data processing system is further configured to apply voltage below the critical voltage of the systolic array to one or more of the first checksum circuit, the second checksum circuit, and the output checksum circuit; and
in response to receiving the indication, continue applying voltage below the critical voltage to one or more of the first checksum circuit, the second checksum circuit, and the output checksum circuit.

19. The data processing system of claim 16, wherein the data processing system is configured to send a control signal to the one or both of the first and second checksum circuit, wherein the timing of the sending is based on the number of time steps to load first or second input values across the systolic array.

20. One or more non-transitory computer-readable storage media encoded with computer instructions that when executed by a computation unit comprising a two-dimensional systolic array of processing elements, a first checksum circuit, a second checksum circuit, and an output checksum circuit, cause the computation unit to perform operations comprising:
receiving, by the systolic array, first input elements from a first input matrix along a first direction of the systolic array,
receiving, by the systolic array, second input elements from a second input matrix along a second direction of the systolic array;
generating, by the first checksum circuit, one or more groups of first checksums from the first input elements while the systolic array receives the first input elements;
generating, by the second checksum circuit, one or more groups of second checksums while the systolic array receives the second input elements;
generating, by the systolic array, an output matrix from the first input matrix, the second input matrix, the one or more groups of first checksums, and the one or more groups of second checksums;
receiving, by the output checksum circuit, the output matrix; and
determining, by the output checksum circuit and from the output matrix, the occurrence of one or more errors in the generation of the output matrix.

* * * * *